United States Patent
Jones et al.

(10) Patent No.: US 7,659,337 B2
(45) Date of Patent: *Feb. 9, 2010

(54) ELASTOMERIC BLEND FOR AIR BARRIERS COMPRISING GRAFTED RESIN COMPONENTS

(75) Inventors: Glenn Edward Jones, Kingwood, TX (US); Mun Fu Tse, Seabrook, TX (US); Hsien-Chang Wang, Bellaire, TX (US); Kenneth Lewtas, Tervuren (BE); William Moa-Tseng Chien, Houston, TX (US); Walter Harvey Waddell, Pasadena, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/865,574

(22) Filed: Oct. 1, 2007

(65) Prior Publication Data

US 2008/0021149 A1   Jan. 24, 2008

Related U.S. Application Data

(63) Continuation of application No. 10/689,942, filed on Oct. 21, 2003, now Pat. No. 7,294,664.

(60) Provisional application No. 60/424,413, filed on Nov. 7, 2002.

(51) Int. Cl.
C08K 3/34 (2006.01)
C08K 5/01 (2006.01)

(52) U.S. Cl. .................. 524/445; 524/474; 524/495; 524/525; 524/578

(58) Field of Classification Search .......... 524/445, 524/474, 495, 525, 578
See application file for complete search history.

(56) References Cited

U.S. PATENT DOCUMENTS

| | | | |
|---|---|---|---|
| 3,161,620 A | 12/1964 | Perkins et al. | 260/78.4 |
| 3,933,720 A | 1/1976 | Iwai et al. | 260/31.2 MR |
| 3,954,912 A | 5/1976 | Werner et al. | 260/880 R |
| 4,086,198 A | 4/1978 | Mizui et al. | 260/23.7 C |
| 4,113,799 A | 9/1978 | Van Ornum et al. | 260/876 B |
| 4,207,223 A | 6/1980 | Schülde et al. | 260/29.6 WB |
| 4,299,931 A | 11/1981 | Coran et al. | 525/95 |
| 4,413,067 A | 11/1983 | Tsuchiya et al. | 523/172 |
| 4,513,130 A | 4/1985 | Mizui et al. | 526/283 |
| 4,670,349 A | 6/1987 | Nakagawa et al. | 428/516 |
| 4,703,091 A | 10/1987 | Gardner et al. | 525/332.3 |
| 4,714,732 A | 12/1987 | Hoshino | 524/474 |
| 4,719,260 A | 1/1988 | Stuart, Jr. et al. | 525/74 |
| 4,754,793 A | 7/1988 | Mohammed | 152/510 |
| 5,001,185 A | 3/1991 | Teratani et al. | 524/495 |
| 5,102,958 A | 4/1992 | Hous et al. | 575/332.8 |
| 5,246,778 A | 9/1993 | Costemalle et al. | 428/398 |
| 5,317,055 A | 5/1994 | Yang | 524/458 |
| 5,621,045 A | 4/1997 | Patel et al. | 525/237 |
| 5,631,316 A | 5/1997 | Costemalle et al. | 524/521 |
| 5,665,183 A | 9/1997 | Kresge et al. | 152/204 |
| 6,372,851 B1 | 4/2002 | Theelen | 525/285 |
| 6,620,871 B2 | 9/2003 | Wilson, III | 524/398 |
| 2004/0092648 A1 | 5/2004 | Jones et al. | 524/502 |
| 2005/0197442 A1 | 9/2005 | Jones et al. | 524/474 |

FOREIGN PATENT DOCUMENTS

| | | |
|---|---|---|
| EP | 0 088 510 | 9/1983 |
| EP | 0 296 332 | 12/1988 |
| EP | 0 314 416 | 5/1989 |
| EP | 0 651 009 | 5/1995 |
| EP | 0 703 275 | 3/1996 |
| EP | 1 295 926 | 3/2003 |
| WO | WO 93/08220 | 4/1993 |
| WO | WO 02/32992 | 4/2002 |
| WO | WO 02/48257 | 6/2002 |

OTHER PUBLICATIONS

Abstract from Shanghai Tire Rubber Ltd. (1993).
JP 52 090535 Abstract (Jul. 29, 1977).
Abstract from Shanghai Tire Rubber Ltd. (Jan. 2003).
Abstract from Shanghai Tire Rubber Ltd. (earlier than Jan. 1, 1994).

*Primary Examiner*—Kriellion A Sanders

(57) ABSTRACT

A composition suitable for an air barrier such as an automotive tire innertube, innerliner, and aircraft tire innertube or innerliner, curing bladders, and other pneumatic devices is disclosed. The composition comprises an elastomer, a processing oil, and a grafted resin component.

21 Claims, No Drawings

ELASTOMERIC BLEND FOR AIR BARRIERS COMPRISING GRAFTED RESIN COMPONENTS

CROSS REFERENCE TO RELATED APPLICATION

This application is a Continuation of Ser. No. 10/689,942, filed Oct. 21, 2003, now U.S. Pat. No. 7,294,664 and claims the priority benefit of Provisional Application No. 60/424,413, filed Nov. 7, 2002, the disclosure of which is incorporated by reference.

BACKGROUND

The present invention relates to blends of an elastomer, a processing oil, and a grafted resin component for use in air barriers.

Halobutyl rubbers, which are isobutylene-based copolymers of $C_4$ to $C_7$ isoolefins and a multiolefins, are the polymers of choice for best air-retention in tires for passenger, truck, bus and aircraft vehicles. Bromobutyl rubber, chlorobutyl rubber, and halogenated star-branched butyl rubbers can be formulated for these specific applications. The selection of ingredients and additives for the final commercial formulation depends upon the balance of properties desired—namely, processing properties of the green (uncured) compound in the tire plant versus the in-service performance of the cured tire composite, as well as the nature of the tire.

It is generally known that resins may be incorporated into air barrier compositions, see for example WO 02/48257, the prior compositions have generally used resins with higher glass transition temperatures, 50° C. or higher. Other background references include U.S. Pat. Nos. 4,413,067, 4,513,130, 5,246,778, 6,372,851, and EP 0 651 009 A. It is believed that the presently disclosed air barrier compositions containing non-aromatic processing oils in conjunction with a grafted resin component resin can be used in certain formulations to surprisingly improve air barrier qualities by decreasing the air permeability and brittleness temperature, while maintaining other desirable properties of the compositions.

U.S. Pat. No. 4,754,793 discloses a rubber composition comprising one hundred parts by weight of at least one butyl-type rubbery polymer; from about 3 to about 20 parts by weight of an aromatic hydrocarbon resin (α-methylstyrene homopolymer) having a softening point of about 93° C. to about 150° C. and a Tg of about 15° C. to about 75° C.; from about 30 to about 90 parts by weight of at least one carbon black, from 0 to about 7 parts by weight of hydrocarbon extender oil, and a curing system.

U.S. Pat. No. 4,113,799 discloses a carbon reinforced, partially cross-linked butyl rubber matrix sealant composition as described is particularly suitable for use as a self-healing tire puncture sealant. The sealant composition comprises a high average molecular weight butyl rubber and a low average molecular weight butyl rubber in a ratio of high to low molecular weight butyl rubber of between about 20/80 to 60/40, in admixture with a tackifier present in an amount between about 55 and 70 weight % of the composition. A partially hydrogenated block copolymer may be included in the admixture.

EP 0 314 416 A2 discloses a new rubber composition comprising from about 70 to about 90 parts by weight of a high molecular weight butyl-type rubbery polymer; from about 10 to about 30 parts by weight of a low molecular weight butyl-type rubber polymer, wherein the total amount of polymers described above is one hundred parts by weight, from about 30 to about 90 parts by weight of at least one carbon black, and a curing system.

SUMMARY

A composition suitable for an air barrier is described herein and comprises: (a) an elastomer comprising $C_4$ to $C_7$ isoolefin derived units; (b) a processing oil; (c) a material selected from (i) a grafted hydrocarbon resin, (ii) grafted oligomers having units selected from the group of cyclopentadiene, substituted cyclopentadiene, $C_5$ monomers, and/or $C_9$ monomers, or (iii) combinations of (i) and (ii). The composition preferably has a green tack above 0.5 N/mm. Cured compositions preferably have a brittleness temperature below −36° C. and an air permeability less than $4.0 \times 10^{-8}$ $cm^3 \cdot cm/cm^2 \cdot sec \cdot atm$. Suitable articles made from the composition may include tire curing bladders, innerliners, tire innertubes, and air sleeves comprising a composition according to any of the preceding claims.

A process for manufacturing an air barrier is also described herein. The process comprises mixing (a) an elastomer comprising $C_4$ to $C_7$ isoolefin derived units; (b) a processing oil; (c) a grafted material obtainable by the reaction of an unsaturated acid or anhydride and (i) a hydrocarbon resin, (ii) oligomers having units selected from the group of cyclopentadiene, substituted cyclopentadiene, $C_4$-$C_6$ conjugated diolefins, and/or $C_8$-$C_{10}$ aromatic olefins, and (iii) combinations of (i) and (ii).

GENERAL DEFINITIONS

The term "phr" is parts per hundred rubber, and is a measure common in the art wherein components of a composition are measured relative to a major elastomer component, based upon 100 parts by weight of the elastomer or elastomers or based upon 100 parts by weight of the elastomer plus the secondary rubber, if included.

As used herein, in reference to Periodic Table "Groups", the new numbering scheme for the Periodic Table Groups are used as in HAWLEY'S CONDENSED CHEMICAL DICTIONARY 852 (13th ed. 1997).

The term "elastomer" as used herein refers to any polymer or composition of polymers consistent with the ASTM D1566 definition. The term "elastomer" may be used interchangeably with the term "rubber", as used herein.

As used herein, the term "alkyl" refers to a paraffinic hydrocarbon group which may be derived from an alkane by dropping one or more hydrogens from the formula, such as, for example, a methyl group ($CH_3$), or an ethyl group ($CH_3CH_2$), etc.

As used herein, the term "alkenyl" refers to an unsaturated paraffinic hydrocarbon group which may be derived from an alkane by dropping one or more hydrogens from the formula, such as, for example, an ethenyl group, $CH_2$=CH, and a propenyl group, or $CH_3CH$=CH, etc.

As used herein, the term "aryl" refers to a hydrocarbon group that forms a ring structure characteristic of aromatic compounds such as, for example, benzene, naphthalene, phenanthrene, anthracene, etc., and typically possess alternate double bonding ("unsaturation") within its structure. An aryl group is thus a group derived from an aromatic compound by dropping one or more hydrogens from the formula such as, for example, phenyl, or $C_6H_5$.

By "substituted", it is meant substitution of at least one hydrogen group by at least one substituent selected from, for example, halogen (chlorine, bromine, fluorine, or iodine), amino, nitro, sulfoxy (sulfonate or alkyl sulfonate), thiol, alkylthiol, and hydroxy; alkyl, straight or branched chain having 1 to 20 carbon atoms which includes methyl, ethyl, propyl, tert-butyl, isopropyl, isobutyl, etc.; alkoxy, straight or branched chain alkoxy having 1 to 20 carbon atoms, and includes, for example, methoxy, ethoxy, propoxy, isopropoxy, butoxy, isobutoxy, secondary butoxy, tertiary butoxy, pentyloxy, isopentyloxy, hexyloxy, heptryloxy, octyloxy, nonyloxy, and decyloxy; haloalkyl, which means straight or branched chain alkyl having 1 to 20 carbon atoms which is substituted by at least one halogen, and includes, for example, chloromethyl, bromomethyl, fluoromethyl, iodomethyl, 2-chloroethyl, 2-bromoethyl, 2-fluoroethyl, 3-chloropropyl, 3-bromopropyl, 3-fluoropropyl, 4-chlorobutyl, 4-fluorobutyl, dichloromethyl, dibromomethyl, difluoromethyl, diiodomethyl, 2,2-dichloroethyl, 2,2-dibromomethyl, 2,2-difluoroethyl, 3,3-dichloropropyl, 3,3-difluoropropyl, 4,4-dichlorobutyl, 4,4-difluorobutyl, trichloromethyl, 4,4-difluorobutyl, trichloromethyl, trifluoromethyl, 2,2,2-trifluoroethyl, 2,3,3-trifluoropropyl, 1,1,2,2-tetrafluoroethyl, and 2,2,3,3-tetrafluoropropyl. Thus, for example, a "substituted styrenic unit" includes p-methylstyrene, p-ethylstyrene, etc.

As used herein, molecular weights (number average molecular weight (Mn), weight average molecular weight (Mw), and z-average molecular weight (Mz)) are measured by Size Exclusion Chromatography using a Waters 150 Gel Permeation Chromatograph equipped with a differential refractive index detector and calibrated using polystyrene standards. Samples are run in tetrahydrofuran (THF) at a temperature of 45° C. Molecular weights are reported as polystyrene-equivalent molecular weights and are generally measured in g/mol.

As used herein aromatic content and olefin content are measured by $^1$H-NMR as measured directly from the $^1$H NMR spectrum from a spectrometer with a field strength greater than 300 MHz, most preferably 400 MHz (frequency equivalent). Aromatic content is the integration of aromatic protons versus the total number of protons. Olefin proton or olefinic proton content is the integration of olefinic protons versus the total number of protons.

DETAILED DESCRIPTION

The compositions disclosed herein generally comprise at least one elastomer, preferably comprising a $C_4$ to $C_7$ isoolefin derived units, a processing oil, and a tackifier selected from (a) a hydrocarbon resin having a Tg below 50° C., (b) oligomers having units selected from the group of cyclopentadiene, substituted cyclopentadiene, $C_4$-$C_6$ conjugated diolefins, and/or $C_8$-$C_{10}$ aromatic olefins, and (b) combinations of (a) and (b).

In some embodiments multiple elastomers and/or secondary rubbers (as described below) may be included. Preferred processing oils include paraffinic oils, aromatic oils, naphthenic oils, and polybutene processing oils are particularly preferred. The processing oils are generally present at 2-20 phr, more preferably 5-15 phr.

The resin is preferably selected from the group consisting of: aliphatic hydrocarbon resins, hydrogenated aliphatic hydrocarbon resins, aromatic hydrocarbon resins, hydrogenated aromatic resins, aliphatic/aromatic hydrocarbon resins, hydrogenated aliphatic/aromatic hydrocarbon resins, cycloaliphatic hydrocarbon resins, hydrogenated cycloaliphatic resins, cycloaliphatic/aromatic hydrocarbon resins, hydrogenated cycloaliphatic/aromatic hydrocarbon resins, polyterpene resins, terpene-phenol resins, rosin esters, grafted versions of any of the above, and mixtures of any two or more thereof. The composition preferably less than 3 phr of α-methylstyrene homopolymer having a softening point of 93° C. to 150° C. and a Tg from 15° C. to 75° C., and preferably comprises a hydrocarbon resin having an aromatics content less than 50%. In a preferred embodiment the hydrocarbon resin has a Tg less than 48° C., more preferably between −30° C. and 35° C. The resin is preferably present at 2-10 phr, more preferably 4-8 phr.

The composition may further comprise one or more fillers and/or secondary rubbers. After curing the composition is useful in a variety of end use applications, including, but not limited to tire curing bladders, innerliners, tire innertubes, and air sleeves. The composition, upon curing, yield air barriers having improved properties such as decreased air and oxygen permeability and lower brittleness temperatures.

Elastomer

The compositions disclosed herein include at least one elastomer. The elastomer preferably comprises $C_4$ to $C_7$ isoolefin derived units. These polymers are generally homopolymers or random copolymers of $C_4$ to $C_7$ isoolefin derived units. The $C_4$ to $C_7$ isoolefin derived units may be selected from isobutylene, isobutene, 2-methyl-1-butene, 3-methyl-1-butene, 2-methyl-2-butene, 1-butene, 2-butene, methyl vinyl ether, indene, vinyltrimethylsilane, hexene, and 4-methyl-1-pentene. Further, the elastomer may also comprise multiolefin derived units selected from isoprene, butadiene, 2,3-dimethyl-1,3-butadiene, myrcene, 6,6-dimethylfulvene, hexadiene, cyclopentadiene, and piperylene. The elastomer may also comprise styrenic-derived units selected from styrene and substituted styrenes, non-limiting examples of which include chlorostyrene, methoxystyrene, indene and indene derivatives, α-methylstyrene, o-methylstyrene, m-methylstyrene, and p-methylstyrene, and p-tert-butylstyrene. The elastomer may also be halogenated.

The elastomer may also be a butyl-type rubber or branched butyl-type rubber, especially halogenated versions of these elastomers. Useful elastomers are unsaturated butyl rubbers such as homopolymers and copolymers of olefins or isoolefins and multiolefins, or homopolymers of multiolefins. These and other types of elastomers suitable for the invention are well known and are described in RUBBER TECHNOLOGY 209-581 (Maurice Morton ed., Chapman & Hall 1995), THE VANDERBILT RUBBER HANDBOOK 105-122 (Robert F. Ohm ed., R.T. Vanderbilt Co., Inc. 1990), and Edward Kresge and H. C. Wang in 8 KIRK-OTHMER ENCYCLOPEDIA OF CHEMICAL TECHNOLOGY 934-955 (John Wiley & Sons, Inc. 4th ed. 1993). Non-limiting examples of unsaturated elastomers useful in the method and composition are poly(isobutylene-co-isoprene), polyisoprene, polybutadiene, poly(styrene-co-butadiene), natural rubber, star-branched butyl rubber, and mixtures thereof. Useful elastomers may be made by any suitable means known in the art, and the invention is not herein limited by the method of producing the elastomer.

Butyl rubbers are prepared by reacting a mixture of monomers, the mixture having at least (1) a $C_4$ to $C_7$ isoolefin monomer component such as isobutylene with (2) a multiolefin, monomer component. The isoolefin is in a range from 70 to 99.5 wt % by weight of the total monomer mixture in one embodiment, and 85 to 99.5 wt % in another embodiment. The multiolefin component is present in the monomer mixture from 30 to 0.5 wt %, preferably 25 to 0.5 wt %, more preferably 20 to 0.5 wt %, more preferably 15 to 0.5 wt %, more preferably 10 to 0.5 wt % and more preferably 8 to 0.5 wt %.

The isoolefin is a $C_4$ to $C_7$ compound, non-limiting examples of which are compounds such as isobutylene, isobutene, 2-methyl-1-butene, 3-methyl-1-butene, 2-methyl-2-butene, 1-butene, 2-butene, methyl vinyl ether, indene, vinyltrimethylsilane, hexene, and 4-methyl-1-pentene. The multiolefin is a $C_4$ to $C_{14}$ multiolefin such as isoprene, butadiene, 2,3-dimethyl-1,3-butadiene, myrcene, 6,6-dimethylfulvene, hexadiene, cyclopentadiene, and piperylene, and other monomers such as disclosed in EP 0 279 456 and U.S. Pat. Nos. 5,506,316 and 5,162,425. Other polymerizable monomers such as styrene and dichlorostyrene are also suitable for homopolymerization or copolymerization in butyl rubbers. One embodiment of the butyl rubber polymer may be obtained by reacting 95 to 99.5 wt % of isobutylene with 0.5 to 8 wt % isoprene, more preferably 0.5 wt % to 5.0 wt % isoprene. Butyl rubbers and methods of their production are described in detail in, for example, U.S. Pat. Nos. 2,356,128, 3,968,076, 4,474,924, 4,068,051 and 5,532,312.

Suitable butyl rubbers are EXXON® BUTYL Grades of poly(isobutylene-co-isoprene), having a Mooney viscosity of 32±2 to 51±5 (ML 1+8 at 125° C., ASTM D 1646). Another suitable butyl-type rubber is VISTANEX™ polyisobutylene rubber having a molecular weight viscosity average of $0.9\pm0.15\times10^6$ to $2.11\pm0.23\times10^6$.

The butyl rubber may also be a branched or "star-branched" butyl rubber. These rubbers are described in, for example, EP 0 678 529 B1, U.S. Pat. Nos. 5,182,333 and 5,071,913. In one embodiment, the star-branched butyl rubber ("SBB") is a composition of a butyl rubber, either halogenated or not, and a polydiene or block copolymer, either halogenated or not. The invention is not limited by the method of forming the SBB. The polydienes/block copolymer, or branching agents (hereinafter "polydienes"), are typically cationically reactive and are present during the polymerization of the butyl or halogenated butyl rubber, or can be blended with the butyl rubber to form the SBB. The branching agent or polydiene can be any suitable branching agent, and the invention is not limited to the type of polydiene used to make the SBB.

The SBB is typically a composition of the butyl or halogenated butyl rubber as described above and a copolymer of a polydiene and a partially hydrogenated polydiene selected from the group including styrene, polybutadiene, polyisoprene, polypiperylene, natural rubber, styrene-butadiene rubber, ethylene-propylene-diene rubber (EPDM), ethylene-propylene rubber (EPR), styrene-butadiene-styrene and styrene-isoprene-styrene block copolymers. These polydienes are present, based on the monomer wt %, greater than 0.3 wt %, more preferably from 0.3 to 3 wt %, and more preferably 0.4 to 2.7 wt %.

One suitable SBB is SB Butyl 4266 (ExxonMobil Chemical Company, Houston Tex.), having a Mooney viscosity (ML 1+8 at 125° C., ASTM D 1646, modified) of 34 to 44. Further, cure characteristics of SB Butyl 4266 are as follows: MH is 69±6 dN·m, ML is 11.5±4.5 dN·m (ASTM D 2084).

The elastomer may also be halogenated. Halogenated butyl rubber is produced by the halogenation of the butyl rubber product described above. Halogenation can be carried out by any means, and the halogenation process does not limit the invention. Methods of halogenating polymers such as butyl polymers are disclosed in U.S. Pat. Nos. 2,631,984, 3,099,644, 4,554,326, 4,681,921, 4,650,831, 4,384,072, 4,513,116 and 5,681,901. In one embodiment, the butyl rubber is halogenated in hexane diluent at from 4 to 60° C. using bromine ($Br_2$) or chlorine ($Cl_2$) as the halogenation agent. The halogenated butyl rubber has a Mooney viscosity of 20 to 70 (ML 1+8 at 125° C.), more preferably from 25 to 55. The halogen wt % is from 0.1 to 10 wt % based in on the weight of the halogenated butyl rubber, more preferably 0.5 to 5 wt %, and more preferably 1 to 2.5 wt %.

One suitable halogenated butyl rubber is Bromobutyl 2222 (ExxonMobil Chemical Company), having a Mooney viscosity is from 27 to 37 (ML 1+8 at 125° C., ASTM 1646, modified) and a bromine content from 1.8 to 2.2 wt % relative to the Bromobutyl 2222. Further, cure characteristics of Bromobutyl 2222 are as follows: MH is from 28 to 40 dN·m, ML is from 7 to 18 dN·m (ASTM D 2084). Another suitable halogenated butyl rubber is Bromobutyl 2255 (ExxonMobil Chemical Company), having a Mooney Viscosity is from 41 to 51 (ML 1+8 at 125° C., ASTM D 1646, modified) and a bromine content from 1.8 to 2.2 wt %. Further, cure characteristics of Bromobutyl 2255 are as follows: MH is from 34 to 48 dN·m, ML is from 11 to 21 dN·m (ASTM D 2084).

The elastomer may also be a branched or "star-branched" halogenated butyl rubber. The halogenated star-branched butyl rubber may be a composition of a butyl rubber, either halogenated or not, and a polydiene or block copolymer, either halogenated or not. The halogenation process is described in detail in U.S. Pat. Nos. 4,074,035, 5,071,913, 5,286,804, 5,182,333 and 6,228,978. The invention is not limited by the method of forming the halogenated star branched butyl rubber. The polydienes/block copolymer, or branching agents (hereinafter "polydienes"), are typically cationically reactive and are present during the polymerization of the butyl or halogenated butyl rubber, or can be blended with the butyl or halogenated butyl rubber to form the halogenated star branched butyl rubber. The branching agent or polydiene can be any suitable branching agent, and the invention is not limited to the type of polydiene used to make the halogenated star branched butyl rubber.

The halogenated star branched butyl rubber is typically a composition of the butyl or halogenated butyl rubber as described above and a copolymer of a polydiene and a partially hydrogenated polydiene selected from the group including styrene, polybutadiene, polyisoprene, polypiperylene, natural rubber, styrene-butadiene rubber, ethylene-propylene-diene rubber, styrene-butadiene-styrene and styrene-isoprene-styrene block copolymers. These polydienes are present (based on the monomer wt %) in amounts greater than 0.3 wt %, more preferably 0.3 to 3 wt %, and more preferably 0.4 to 2.7 wt %.

A suitable halogenated star branched butyl rubber is Bromobutyl 6222 (ExxonMobil Chemical Company), having a Mooney viscosity (ML 1+8 at 125° C., ASTM D 1646, modified) of 27 to 37 and a bromine content of 2.2 to 2.6 wt % relative to the halogenated star branched butyl rubber. Further, cure characteristics of Bromobutyl 6222 are as follows: MH is from 24 to 38 dN·m, ML is from 6 to 16 dN·m (ASTM D 2084).

The elastomer may also comprise styrenic derived units. The elastomer may also be a random copolymer comprising $C_4$ to $C_7$ isoolefin derived units, such as isobutylene derived units, and styrenic units selected from styrene and substituted styrenes such as, for example, chlorostyrene, methoxystyrene, indene and indene derivatives, α-methylstyrene, o-methylstyrene, m-methylstyrene, and p-methylstyrene, p-halomethylstyrene (also including ortho and meta-halomethylstyrene) and p-tert-butylstyrene. In one embodiment, the halomethylstyrene-derived unit is a p-halomethylstyrene containing at least 80%, more preferably at least 90% by weight of the para-isomer. The "halo" group can be any halogen, preferably chlorine or bromine. The halogenated elastomer may also include functionalized interpolymers wherein at least some of the alkyl substituents groups present in the styrene monomer units contain benzylic halogen or some other functional group described further below.

Preferred materials may be characterized as terpolymers containing $C_4$ to $C_7$ isoolefin derived units and the following monomer units randomly spaced along the polymer chain:

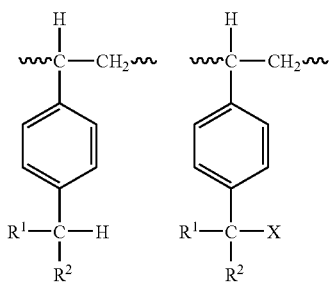

wherein $R^1$ and $R^2$ are independently hydrogen, lower alkyl, preferably $C_1$ to $C_7$ alkyl and primary or secondary alkyl halides and X is a functional group such as halogen. Preferably $R^1$ and $R^2$ are each hydrogen. Up to 60 mol % of the para-substituted styrene present in the elastomer structure may be the functionalized structure above in one embodiment, and in another embodiment from 0.1 to 5 mol %.

The functional group X may be halogen or a combination of a halogen and some other functional group such which may be incorporated by nucleophilic substitution of benzylic halogen with other groups such as carboxylic acids; carboxy salts; carboxy esters, amides and imides; hydroxy; alkoxide; phenoxide; thiolate; thioether; xanthate; cyanide; nitrile; amino and mixtures thereof. These functionalized isoolefin copolymers, their method of preparation, methods of functionalization, and cure are more particularly disclosed in U.S. Pat. No. 5,162,445, and in particular, the functionalized amines as described above.

One suitable elastomer is poly(isobutylene-co-p-methylstyrene), or "XP-50" (ExxonMobil Chemical Company, Houston Tex.). Another suitable elastomer is a terpolymer of isobutylene and p-methylstyrene containing from 0.5 to 20 mol % p-methylstyrene, wherein up to 60 mol % of the methyl substituent groups present on the benzyl ring contain a bromine or chlorine atom, preferably a bromine atom (p-bromomethylstyrene), as well as a combination of p-bromomethylstyrene and other functional groups such as ester and ether. These halogenated elastomers are commercially available as EXXPRO™ Elastomers (ExxonMobil Chemical Company, Houston Tex.), and abbreviated as "BIMS". These isoolefin copolymers, their method of preparation and cure are more particularly disclosed in U.S. Pat. No. 5,162,445. These elastomers have a substantially homogeneous compositional distribution such that at least 95% by weight of the polymer has a p-alkylstyrene content within 10% of the average p-alkylstyrene content of the polymer. Desirable copolymers are also characterized by a molecular weight distribution (Mw/Mn) of between 2 and 20 in one embodiment, and less than 10 in another embodiment, and less than 5 in another embodiment, and less than 2.5 in yet another embodiment, and greater than 2 in yet another embodiment; a preferred viscosity average molecular weight in the range of 200,000 up to 2,000,000 and a preferred number average molecular weight in the range of 25,000 to 750,000 as determined by gel permeation chromatography.

The "elastomer", as described herein, may also comprise a composition of one or more of the same elastomer having differing molecular weights to yield a composition having a bimodal molecular weight distribution. This bimodal distribution can be achieved by, for example, having a low molecular weight component in the elastomer. This can be accomplished by physically blending two different Mw polymers together, or by in situ reactor blending. In one embodiment, the elastomer has a low molecular weight (weight average molecular weight) component of 5,000 Mw to 80,000 Mw in one embodiment, and from 10,000 Mw to 60,000 Mw in another embodiment; the low molecular weight component comprising from 5 to 40 wt % of the composition in one embodiment, and from 10 to 30 wt % of the composition in another embodiment.

In a preferred embodiment, the functionality is selected such that it can react or form polar bonds with functional groups present in the matrix polymer, for example, acid, amino or hydroxyl functional groups, when the polymer components are mixed at high temperatures.

The XP-50 and BIMS polymers may be prepared by a slurry polymerization of the monomer mixture using a Lewis acid catalyst, followed by halogenation, preferably bromination, in solution in the presence of halogen and a radical initiator such as heat and/or light and/or a chemical initiator and, optionally, followed by electrophilic substitution of bromine with a different functional moiety.

Preferred BIMS polymers are brominated polymers that generally contain from 0.1 to 5 mole % of bromomethylstyrene groups relative to the total amount of monomer derived units in the polymer, more preferably 0.2 to 3.0 mol %, more preferably 0.3 to 2.8 mol %, more preferably 0.4 to 2.5 mol %, and more preferably 0.3 to 2.0 mol %, wherein a desirable range may be any combination of any upper limit with any lower limit. Expressed another way, preferred copolymers contain from 0.2 to 10 wt % of bromine, based on the weight of the polymer, more preferably 0.4 to 6 wt %, more preferably 0.6 to 5.6 wt % and are substantially free (less than 0.10 wt %) of ring halogen or halogen in the polymer backbone chain. The elastomer may also be a copolymer of $C_4$ to $C_7$ isoolefin derived units (or isomonoolefin), p-methylstyrene derived units and p-halomethylstyrene derived units, wherein the p-halomethylstyrene units are present in the interpolymer from 0.4 to 3.0 mol % based on the total number of p-methylstyrene, and wherein the para-methylstyrene derived units are present from 3 to 15 wt % based on the total weight of the polymer, more preferably 4 to 10 wt %. In another embodiment, the p-halomethylstyrene is p-bromomethylstyrene.

In a preferred embodiment the elastomer may be a copolymer or terpolymer and comprises unit selected from isobutylene, isobutene, 2-methyl-1-butene, 3-methyl-1-butene, 2-methyl-2-butene, 1-butene, 2-butene, methyl vinyl ether, indene, vinyltrimethylsilane, hexene, 4-methyl-1-pentene, isoprene, butadiene, 2,3-dimethyl-1,3-butadiene, myrcene, 6,6-dimethyl-fulvene, hexadiene, cyclopentadiene, piperylene, styrene, chlorostyrene, methoxystyrene, indene and indene derivatives, α-methylstyrene, o-methylstyrene, m-methylstyrene, and p-methylstyrene, and p-tert-butylstyrene. The copolymer or terpolymer may also be halogenated.

The elastomer may be present in compositions from 10 to 100 phr (100 phr meaning a single elastomer or rubber present) in one embodiment, and from 20 to 80 phr in another embodiment, and from 30 to 70 phr in yet another embodiment, and from 40 to 60 phr in yet another embodiment, wherein a desirable phr range for the elastomer is any upper phr limit combined with any lower phr limit described herein.

Processing Oil

A processing oil may be present in air barrier compositions. The processing oil may be selected from paraffinic oil, aromatic oils, naphthenic oils, and polybutene oils. In one embodiment, the polybutene processing oil is a low molecular weight (less than 15,000 Mn) homopolymer or copolymer of olefin derived units having from 3 to 8 carbon atoms, more preferably 4 to 6 carbon atoms. In yet another embodiment, the polybutene is a homopolymer or copolymer of a $C_4$ raffinate. An embodiment of such low molecular weight polymers termed "polybutene" polymers is described in, for example, SYNTHETIC LUBRICANTS AND HIGH-PERFORMANCE FUNCTIONAL FLUIDS 357-392 (Leslie R. Rudnick & Ronald L. Shubkin, ed., Marcel Dekker 1999) (hereinafter "polybutene processing oil" or "polybutene").

The polybutene processing oil may be a copolymer of isobutylene-derived units, 1-butene derived units, and 2-butene derived units. The polybutene may also be a homopolymer, copolymer, or terpolymer of the three units, wherein the isobutylene derived units are from 40 to 100 wt % of the copolymer, the 1-butene derived units are from 0 to 40 wt % of the copolymer, and the 2-butene derived units are from 0 to 40 wt % of the copolymer. In another embodiment, the polybutene is a copolymer or terpolymer of the three units, wherein the isobutylene derived units are from 40 to 99 wt % of the copolymer, the 1-butene derived units are from 2 to 40 wt % of the copolymer, and the 2-butene derived units are from 0 to 30 wt % of the copolymer. In yet another embodiment, the polybutene is a terpolymer of the three units, wherein the isobutylene derived units are from 40 to 96 wt % of the copolymer, the 1-butene derived units are from 2 to 40 wt % of the copolymer, and the 2-butene derived units are from 2 to 20 wt % of the copolymer. In yet another embodiment, the polybutene is a homopolymer or copolymer of isobutylene and 1-butene, wherein the isobutylene derived units are from 65 to 100 wt % of the homopolymer or copolymer, and the 1-butene derived units are from 0 to 35 wt % of the copolymer.

Polybutene processing oils typically have a number average molecular weight (Mn) of less than 15,000, more preferably less than 14000, more preferably less than 13000, more preferably less than 12000, more preferably less than 11000, more preferably less than 10,000, more preferably less than 9000, more preferably less than 8000, more preferably less than 7000, more preferably less than 6000, more preferably less than 5000, more preferably less than 4000, more preferably less than 3000, and more preferably less than 2000. In one embodiment, the polybutene oil has a number average molecular weight of greater than 400, more preferably greater than 500, more preferably greater than 600, more preferably greater than 700, more preferably greater than 800, and more preferably greater than 900. Preferred embodiments can be combinations of any lower molecular weight limit with any upper molecular weight limit herein. For example, in one non-limiting embodiment of the polybutene, the polybutene has a number average molecular weight of 400 to 10,000, and from 700 to 8000 in another embodiment, and from 900 to 3000 in yet another embodiment. Useful viscosities of the polybutene processing oil are preferably greater than greater than 35 cSt at 100° C., more preferably greater than 100 cSt at 100° C., and preferred ranges include 10 to 6000 cSt (centiStokes) at 100° C., and more preferably 35 to 5000 cSt at 100° C.

Examples of such a processing oil are the PARAPOL™ series of processing oils (ExxonMobil Chemical Company, Houston Tex.), such as PARAPOL™ 450, 700, 950, 1300, 2400, and 2500. The PARAPOL™ series of polybutene processing oils are typically synthetic liquid polybutenes, each individual formulation having a certain molecular weight, all formulations of which can be used in the composition. The molecular weights of the PARAPOL™ oils are from 420 Mn (PARAPOL™ 450) to 2700 Mn (PARAPOL™ 2500). The MWD of the PARAPOL™ oils range from 1.8 to 3, preferably 2 to 2.8. The density (g/ml) of PARAPOL™ processing oils varies from about 0.85 (PARAPOL™ 450) to 0.91 (PARAPOL™ 2500). The bromine number (CG/G) for PARAPOL™ oils ranges from 40 for the 450 Mn processing oil, to 8 for the 2700 Mn processing oil.

Another suitable series of processing oils are the TPC™ series of processing oils, which are commercially available from Texas Petrochemicals, LP in Houston, Tex. Suitable examples include TPC™ 150, 175, 1105, 1160 and 1285. The TPC™ series of polybutene processing oils are typically synthetic liquid polybutenes, each individual formulation having a certain molecular weight, all formulations of which can be used in the composition.

Below, Table 1 shows some of the properties of the TPC™ oils described herein, wherein the viscosity was determined as per ASTM D445.

TABLE 1

Properties of individual TPC ™ Grades

| Grade | Mn | Viscosity @ 100° C., cSt |
|---|---|---|
| 150 | 500 | 13 |
| 175 | 750 | 85 |
| 1105 | 1000 | 220 |
| 1160 | 1600 | 662 |
| 1285 | 2900 | 3250 |

The elastomeric composition may include one or more types of polybutene as a mixture, blended either prior to addition to the elastomer or with the elastomer. The amount and identity (e.g., viscosity, Mn, etc.) of the polybutene processing oil mixture can be varied in this manner. Thus, TPC™ 150 can be used when low viscosity is desired in the composition, while TPC™ 1285 can be used when a higher viscosity is desired, or compositions thereof to achieve some other viscosity or molecular weight. In this manner, the physical properties of the composition can be controlled. As used herein process oil make include a single oil or a composition of two or more oils used to obtain any viscosity or molecular weight (or other property) desired, as specified in the ranges disclosed herein.

Other suitable processing oils include the SUNDEX™ series of oils available from Sunoco, Inc., particularly SUNDEX™ 750T, 790, 790T, 8125, and 8600T and the CALSOL™ series of oils available from R. E. Carroll, particularly CALSOL™ 510, 5120, 5550, 804, 806, and 810. Properties of these oils can be found in THE BLUE BOOK: MATERIALS, COMPOUNDING INGREDIENTS, MACHINERY AND SERVICES FOR RUBBER (published by Rubber World magazine, a Lippincott & Peto publication, 1867 West Market St., Akron, Ohio), which is incorporate herein by reference.

The processing oil or oils are generally present in the elastomeric composition from 1 to 60 phr, preferably from 2 to 40 phr, more preferably from 4 to 35 phr, more preferably from 5 to 30 phr, more preferably from 5 to 25 phr, more preferably 5 to 15, more preferably 6 to 14, more preferably 8 to 14, more preferably from 2 to 20 phr, more preferably from 2 to 10 phr, wherein a preferred range of processing oil may be any upper phr limit combined with any lower phr limit described herein.

Resins

The compositions disclosed herein also preferably include a resin additive, which is preferably a grafted resin component as described below, in amounts between 1 to 60 phr, preferably from 2 to 40 phr, more preferably from 2 to 35 phr, more preferably from 2 to 30 phr, more preferably from 2 to 25 phr, more preferably 2 to 20, more preferably 2 to 15, more preferably 2 to 10, more preferably from 2 to 8 phr, more preferably from 3 to 7 phr, and more preferably 4 to 6 phr, wherein a preferred range of resin may be any upper phr limit combined with any lower phr limit described herein. The resin used in the composition may comprise resin blends as described below.

Grafted Hydrocarbon Resin Components

As used herein, a grafted hydrocarbon resin, oligomer, and/or resin material, or a combination thereof means it has been combined, contacted, and/or reacted with a graft monomer. Grafting is the process of combining, contacting, or reacting the hydrocarbon resin, oligomers and/or resin material with the graft monomer. Grafting hydrocarbon resins, oligomers, and/or resin material, or a combination thereof to include at least some polar functionality produces useful components for many applications such as tire innerliner formulations.

Grafted resin materials may include, but is not limited to: adhesives or adhesive components comprising (i) grafted hydrocarbon resins; (ii) grafted oligomers, (iii) grafted oligomers+ungrafted resin(s), (iv) grafted hydrocarbon resin+ungrafted resin(s), (v) grafted hydrocarbon resin+ungrafted oligomers, (vi) grafted hydrocarbon resin+grafted oligomers, (vii) grafted oligomers+ungrafted oligomers or (viii) grafted hydrocarbon resin+grafted oligomers+ungrafted resin(s) and other suitable combinations of one or more thereof.

Suitable hydrocarbon resins that may be grafted include: aliphatic hydrocarbon resins, at least partially hydrogenated aliphatic hydrocarbon resins, aliphatic/aromatic hydrocarbon resins, at least partially hydrogenated aliphatic aromatic hydrocarbon resins, cycloaliphatic hydrocarbon resins, at least partially hydrogenated cycloaliphatic resins, cycloaliphatic/aromatic hydrocarbon resins, at least partially hydrogenated cycloaliphatic/aromatic hydrocarbon resins, at least partially hydrogenated aromatic hydrocarbon resins, polyterpene resins, terpene-phenol resins, and mixtures of two or more thereof. Preferably, the resin is at least partially hydrogenated, more preferably substantially hydrogenated, and more preferably comprises aromatic monomers.

The resin and/or oligomers are preferably at least partially hydrogenated and more preferably substantially hydrogenated. As used herein at least partially hydrogenated means that the material contains less than 90% olefinic protons, more preferably less than 75% olefinic protons, more preferably less than 50% olefinic protons, more preferably less than 40% olefinic protons, more preferably less than 25% olefinic protons, more preferably less than 15% olefinic protons, more preferably less than 10% olefinic protons, more preferably less than 9% olefinic protons, more preferably less than 8% olefinic protons, more preferably less than 7% olefinic protons, and more preferably less than 6% olefinic protons. As used herein, substantially hydrogenated means that the material contains less than 5% olefinic protons, more preferably less than 4% olefinic protons, more preferably less than 3% olefinic protons, more preferably less than 2% olefinic protons, more preferably less than 1% olefinic protons, more preferably less than 0.5% olefinic protons, more preferably less than 0.1% olefinic protons, and more preferably less than 0.05% olefinic protons after hydrogenation (and before reaction with the graft monomer). The degree of hydrogenation is typically conducted so as to minimize and preferably avoid hydrogenation of the aromatic bonds. In preferred embodiments wherein the resin and/or oligomers are substantially hydrogenated, it is believed that the graft monomer is appended to the resin/oligomer backbone as opposed to forming a copolymer (of resin/oligomers and graft monomers) because of the lack of terminal olefinic bonds on the substantially hydrogenated resin/oligomers (as indicated by the preferred low olefinic proton measurements).

In a preferred embodiment, the hydrocarbon resin/and or oligomers have an aromatic content of 1-60%, more preferably 1-40%, more preferably 1-20%, more preferably 1-15%, more preferably 5-15%, more preferably 10-20%, more preferably 15-20%, and in another embodiment, more preferably 1-10%, and more preferably 5-10%, wherein any upper limit and any lower limit of aromatic content may be combined for a preferred range of aromatic content. In one embodiment, the hydrocarbon resin to be grafted has a softening point of 10-200° C., more preferably 10-160° C., more preferably 60-130° C., more preferably 90-130° C., more preferably 80-120° C., more preferably 80-150° C., and more preferably 90-110° C., wherein any upper limit and any lower limit of softening point may be combined for a preferred softening point range. Softening point (° C.) is preferably measured as a ring and ball softening point according to ASTM E-28 (Revision 1996).

Suitable grafted resins include EMFR 100, 100A, and 101 available from ExxonMobil Chemical Company. In one embodiment, a grafted resin comprises hydrocarbon resins produced by the thermal polymerization of dicyclopentadiene (DCPD) or substituted DCPD which are then grafted with a graft monomer. The resin may further include aliphatic or aromatic monomers as described later. In another embodiment, the hydrocarbon resin is produced by the thermal polymerization of dicyclopentadiene (DCPD) or substituted DCPD and $C_9$ monomers or thermal or catalytic polymerization of $C_5$ and $C_9$ monomers. In a preferred embodiment, the grafted resins contain less than 10% aromatics in the final resin product. In another embodiment, the grafted resin comprises 95 wt % of a thermally polymerized dicyclopentadiene resin comprising about 10% aromatics, available as Escorez 5600, grafted with maleic anhydride, and 5 wt % of grafted oligomers derived from the production of Escorez 5600 and also grafted with maleic anhydride.

Grafted Oligomers

The hydrocarbon resin also comprises oligomers (dimers, trimers, tetramers, pentamers, hexamers and optionally septamers and octamers), preferably derived from a petroleum distillate boiling in the range of 30-210° C. The oligomers can be derived from any suitable process and are often derived as a byproduct of resin polymerization, whether thermal or catalytic. The oligomers may be derived from processes wherein suitable DCPD, $C_5$ and/or $C_9$ monomer feeds (as described below) are oligomerized and then grafted. Suitable oligomer streams have molecular weights (Mn) between 130-500, more preferably between 130-410, more preferably between 130-350, more preferably between 130-270, more preferably between 200-350, and more preferably between 200-320. The oligomers may be grafted as described herein.

The oligomers may comprise cyclopentadiene and substituted cyclopentadiene monomers and may further comprise $C_9$ monomers. In another embodiment, the oligomers comprise C$_5$ monomers and may further comprise C$_9$ monomers. Other monomers may also be present, including C$_4$-C$_6$ mono- and di-olefins and terpenes. The oligomers may also be solely C$_9$ monomers. Specific examples of suitable individual cyclopentadiene and substituted cyclopentadiene monomers (including DCPD), C$_9$ monomers and C$_5$ monomers are described below. Suitable oligomers may also comprise a mixture of more or more preferred oligomer materials as described herein.

Graft Monomers

Preferred graft monomers include any unsaturated organic compound containing at least one olefinic bond and at least one polar group such as a carbonyl group, which includes unsaturated acids and anhydrides and derivatives thereof. Preferably, the organic compound contains an ethylenic unsaturation conjugated with a carbonyl group (—C=O) and preferably contains at least one α, β olefin bond. Examples include carboxylic acids, acid halides or anhydrides, phenols, alcohols (mono-alcohols, diols, and polyols), ethers, ketones, alkyl and aromatic amines (including polyamines), nitriles, imines, isocyanates, nitrogen compounds, halides and combinations and derivatives thereof. Representative acids and acid derivatives include carboxylic acids, anhydrides, acid halides, esters, amides, imides and their salts, both metallic and non-metallic. Examples include maleic, fumaric, acrylic, methacrylic, itaconic, aconitic, citraconic, himic, tetrahydrophthalic, crotonic, α-methyl crotonic, and cinnamic acids. Maleic anhydride is a particularly preferred graft monomer. Particular examples include, itaconic anhydride, citraconic anhydride, methyl acrylate, methyl methacrylate, ethyl acrylate, ethyl methacrylate, glycidyl acrylate, monoethyl maleate, diethyl maleate, dibutyl maleate, monomethyl fumarate, diethyl fumarate, monomethyl itaconate, diethyl itaconate, acrylamide, methacrylamide, maleic acid monoamide, maleic acid diamide, maleic acid-N-monoethylamide, maleic acid-N,N-diethylamide, maleic acid-N-monobutylamide, maleic acid-N,N-dibutylamide, fumaric acid monoamide, fumaric acid diamide, fumaric acid-N-monobutylamide, fumaric acid-N,N-dibutylamide, maleimide, N-butylmaleimide, N-phenylmaleimide, sodium acrylate, sodium methacrylate, potassium acrylate and potassium methacrylate. Preferred graft monomers include acids, anhydrides, alcohols, amides, and imides.

Hydrocarbon Resin Production

Hydrocarbon resins are well known and are produced, for example, by Friedel-Crafts polymerisation of various feeds, which may be pure monomer feeds or refinery streams containing mixtures of various unsaturated materials. Generally speaking, the purer the feed the easier to polymerise. For example pure styrene, pure α-methyl styrene and mixtures thereof are easier to polymerise than a C$_8$/C$_9$ refinery stream. Similarly, pure or concentrated piperylene is easier to polymerise than C$_4$-C$_6$ refinery streams. These pure monomers are, however, more expensive to produce than the refinery streams which are often by-products of large volume refinery processes.

Aliphatic hydrocarbon resins can be prepared by cationic polymerisation of a cracked petroleum feed containing C$_4$, C$_5$, and C$_6$ paraffins, olefins, and conjugated diolefins referred to herein as C$_5$ monomers. As used herein, C$_5$ monomers preferably excludes DCPD monomer removed by thermal soaking as described below. These monomer streams comprise cationically and thermally polymerisable monomers such as butadiene, isobutylene, 1,3-pentadiene (piperylene) along with 1,4-pentadiene, cyclopentene, 1-pentene, 2-pentene, 2-methyl-1-pentene, 2-methyl-2-butene, 2-methyl-2-pentene, isoprene, cylcohexene, 1-3-hexadiene, 1-4-hexadiene, cyclopentadiene, and dicyclopentadiene. To obtain these C$_5$ monomer feeds the refinery streams are preferably purified usually by both fractionation and treatment to remove impurities. In some embodiments, the C$_5$ monomer feed stream may include at least some cyclopentadiene (CPD) and substituted cyclopentadiene (e.g, methylcyclopentadiene) components. These components are optionally separated from the C$_5$ monomer streams by thermal soaking wherein the C$_5$ monomer feed stream is heated to a temperature between 100° C. and 150° C. for 0.5 to 6 hours followed by separation of the DCPD monomers, to reduce the level of cyclopentadiene or dicyclopentadiene in the C$_5$ monomer stream to preferably below 2 wt %. Low temperature heat soaking is preferred in order to limit the cyclic diene (cyclopentadiene and methylcyclopentadiene) co-dimerisation with C$_5$ linear conjugated dienes (isoprene and pentadienes 1,3 cis- and trans-). The thermal soaking step preferably dimerizes the cyclopentadiene and substituted cyclopentadiene, making separation from the C$_5$ monomer stream easier. After fractionation and, if carried out, thermal soaking, the feedstock is preferably subjected to distillation to remove cyclic conjugated diolefins which are gel precursors (cyclopentadiene and methylcyclopentadiene being removed as dimers, trimers, etc.).

One example of a C$_5$ monomer stream is a steam cracked petroleum stream boiling in the range of −10° C. to 100° C. Examples of commercial samples of C$_5$ monomer feedstocks include Naphtha Petroleum 3 Piperylenes from Lyondell Petrochemical Company, Houston, Tex., regular Piperylene Concentrate or Super Piperylene Concentrate both from Shell Nederland Chemie B. V., Hoogvilet, the Netherlands.

The resin polymerization feed may also comprise C$_8$-C$_{10}$ aromatic monomers (referred to herein as C$_9$ monomers) such as styrene, indene, derivatives of styrene, derivatives of indene, and combinations thereof. Particularly preferred aromatic olefins include styrene, α-methylstyrene, β-methylstyrene, indene, methylindenes and vinyl toluenes. One example of a C$_9$ monomer stream is a steam cracked petroleum stream boiling in the range of −10° C. to 210° C. (135° C. to 210° C. if the C$_5$ monomers and DCPD components are not present). Examples of commercial C$_9$ monomer feedstocks include LRO-90 from Lyondell Petrochemical Company, Houston, Tex., DSM C$_9$ Resinfeed Classic from DSM, Geleen, the Netherlands, RO-60 and RO-80 from Dow Chemical Company of Midland, Mich., and Dow Resin Oil 60-L from the Dow Chemical Company of Terneuzen, the Netherlands.

In addition to the reactive components, non-polymerisable components in the feed may include saturated hydrocarbons such as pentane, cyclopentane, or 2-methyl pentane that can be co-distilled with the unsaturated components. This monomer feed can be co-polymerised with other C$_4$ or C$_5$ olefins or dimers. Preferably, however, the feeds are purified to remove unsaturated materials that adversely affect the polymerisation reaction or cause undesirable colours in the final resin (e.g., isoprene). This is generally accomplished by fractionation. In one embodiment, polymerization is conducted using Friedel-Crafts polymerisation catalysts such as supported or unsupported Lewis acids (e.g., boron trifluoride (BF$_3$), complexes of boron trifluoride, aluminium trichloride (AlCl$_3$), complexes of aluminium trichloride or alkyl aluminium halides, particularly chlorides). Suitable reaction conditions for Friedel-Crafts polymerisation include temperatures of −20° C. to 100° C., pressures of 100 to 2000 k Pa. C$_5$ and C$_9$ monomers may be polymerized by such a process.

Typically, the feed stream includes between 20-80 wt % monomers and 20-80 wt % solvent. Preferably, the feed stream includes 30-70 wt % monomers and 30-70 wt % of solvent. More preferably, the feed stream includes 50-70 wt % monomers and 30-50 wt % of solvent. The solvent may include an aromatic solvent, which may be toluenes, xylenes, other aromatic solvents, aliphatic solvents and/or mixtures of two or more thereof. The solvent is preferably recycled. The solvent may comprise the unpolymerisable component of the feed. The solvents generally contain less than 250 ppm water, preferably less than 100 ppm water, and most preferably less than 50 ppm water.

The feed stream may include 30-95 wt % of $C_5$ monomers, as described above and 5-70 wt % of a co-feed including at least one member selected from the group consisting of pure monomer, $C_9$ monomers, and terpenes. Preferably, the feed stream includes about 50-85 wt % of $C_5$ monomers and about 15-50 wt % of a co-feed, including at least one member selected from the group consisting of pure monomer, $C_9$ monomers, and terpenes.

Typically, the resulting hydrocarbon resin has a number average molecular weight (Mn) of 400-3000, a weight average molecular weight (Mw) of 500-6000, a z-average molecular weight (Mz) of 700-15,000 and a polydispersity (PD) as measured by Mw/Mn between 1.5 and 4. As used herein, molecular weights (number-average molecular weight (Mn), weight-average molecular weight (Mw), and z-average molecular weight (Mz)) are measured by Size Exclusion Chromatography using a Waters 150 Gel Permeation Chromatograph equipped with a differential refractive index detector and calibrated using polystyrene standards. Samples are run in tetrahydrofuran (THF) (45° C.). Molecular weights are reported as polystyrene-equivalent molecular weights and are generally measured in g/mol.

The monomer feed can be co-polymerised with $C_4$ or $C_5$ olefins or their olefinic dimers as chain transfer agents. Up to 40 wt %, preferably up to 20 wt %, of chain transfer agents may be added to obtain resins with lower and narrower molecular weight distributions than can be prepared from using the monomer feed alone. Chain transfer agents stop the propagation of a growing polymer chain by terminating the chain in a way, which regenerates a polymer initiation site. Components, which behave as chain transfer agents in these reactions include but are not limited to, 2-methyl-1-butene, 2-methyl-2-butene or dimers or oligomers of these species. The chain transfer agent can be added to the reaction in pure form or diluted in a solvent.

A DCPD resin and/or oligomers thereof (referred to also as CPD oligomers) may be obtained by thermal polymerisation of a feed comprising unsaturated monomers of DCPD and/or substituted DCPD. The feed may also comprise aromatic monomers as previously described. Generally, a mixture of (a) DCPD stream, preferably a steam cracked petroleum distillate boiling in the range 80-200° C., more preferably 140° C. to 200° C., containing dimers and codimers of cyclopentadiene and its methyl derivatives together with (b) $C_9$ monomers, preferably a steam cracked distillate boiling in the range 150-200° C. comprising α-methyl styrene, vinyl toluenes, indene and methyl indene with other $C_9$ and $C_{10}$ aromatics, in the weight ratio (a:b) between 90:10 to 50:50 is heated in a batch polymerization reactor to 160-320° C. at a pressure of 980 kPa to 2000 kPa (more preferably $9.8 \times 10^5$ – $11.7 \times 10^5$ Pa), for 1.2 to 4 hours, more preferably 1.5 to 4 hrs. Where inclusion of the oligomers is not desired, the resulting polymerizate may steam stripped to remove inert, unreacted, and low molecular weight oligomeric components to yield a resin having a softening point in the range 80-120° C.

The resin may also be obtained by or derived from thermal polymerisation of a feed comprising $C_5$ monomers and $C_9$ monomers as previously described. In such embodiments, a mixture of (a) $C_5$ monomers, preferably, a steam cracked petroleum distillate boiling in the range 80-200° C. containing $C_5$ monomers together with (b) $C_9$ monomers, preferably a steam cracked distillate boiling in the range 150-200° C. comprising α-methyl styrene, vinyl toluenes, indene and methyl indene with other $C_8$-$C_{10}$ aromatics, in the weight ratio (a:b) between 90:10 to 50:50 is heated in a batch polymerization reactor to 160-320° C. at a pressure of 980 kPa to 2000 kPa (more preferably $9.8 \times 10^5$ – $11.7 \times 10^5$ Pa), for 1.2 to 4 hours, more preferably 1.5 to 4 hrs. Where inclusion of the oligomers is not desired, the resulting polymerizate may be steam stripped to remove inert, unreacted, and low molecular weight oligomeric components to yield a resin having a softening point in the range 80-120° C.

The products of the polymerization process include both resin and an oligomer by-product comprising oligomers (dimers, trimers, tetramers, pentamers, and hexamers, and optionally septamers and octamers) of the feed monomer(s). As used hereafter, resin material refers to the resin, the oligomers, or a mixture of the two. Where the oligomer by-product results from thermal polymerization of DCPD and substituted DCPD, the oligomers are typically a complex mixture of (preferably hydrogenated as described below) Diels Alder trimers and tetramers of CPD and methyl-CPD with low levels of acyclic $C_5$ diolefins such as pentadiene-1,3 and isoprene.

The resin material is then preferably hydrogenated to reduce coloration and improve colour stability. Any of the known processes for catalytically hydrogenating resin material can be used. In particular the processes disclosed in U.S. Pat. No. 5,171,793, U.S. Pat. No. 4,629,766, U.S. Pat. No. 5,502,104 and U.S. Pat. No. 4,328,090 and WO 95/12623 are suitable. Generic hydrogenation treating conditions include reactions in the temperature range of about 100-350° C. and pressures of between 5 atm (506 kPa) and 300 atm (30390 kPa) hydrogen (and even up to 400 atm hydrogen), for example, 10-275 atm (1013-27579 kPa). In one embodiment the temperature is in the range including 180-330° C. and the pressure is in the range including 15195-20260 kPa hydrogen. The hydrogen to feed volume ratio to the reactor under standard conditions (25° C., 1 atm (101 kPa) pressure) typically can range from 20:1-200:1; for water-white resins 100:1-200:1 is preferred. The hydrogenated product may be stripped to remove low molecular weight by-products and any solvent. This oligomeric by-product is a low-viscosity nearly colorless liquid boiling between 250-400° C. and is preferably substantially hydrogenated.

The hydrogenation of the resin material may be carried out via molten or solution based processes by either a batch wise or, more commonly, a continuous process. Catalysts employed for the hydrogenation of hydrocarbon resins are typically supported monometallic and bimetallic catalyst systems based on group 6, 8, 9, 10 or 11 elements. Catalysts such as nickel on a support (for example, nickel on alumina, nickel on charcoal, nickel on silica, nickel on kieselguhr, etc), palladium on a support (for example, palladium on silica, palladium on charcoal, palladium on magnesium oxide, etc) and copper and/or zinc on a support (for example copper chromite on copper and/or manganese oxide, copper and zinc on alumina, etc) are good hydrogenation catalysts. The support material is typically comprised of such porous inorganic refractory oxides as silica, magnesia, silica-magnesia, zirconia, silica-zirconia, titania, silica-titania, alumina, silica-alumina, alumina-silicate, etc, with supports containing γ-alumina being highly preferred. Preferably, the supports are essentially free of crystalline molecular sieve materials. Mixtures of the foregoing oxides are also contemplated, especially when prepared as homogeneously as possible. Useful support materials include those disclosed in the U.S. Pat. Nos. 4,686,030, 4,846,961, 4,500,424, and 4,849,093. Suitable supports include alumina, silica, carbon, MgO, $TiO_2$, $ZrO_2$, $Fe_2O_3$ or mixtures thereof.

Another suitable process for hydrogenating the resin material is described in EP 0082726. EP 0082726 describes a process for the catalytic or thermal hydrogenation using a nickel-tungsten catalyst on a gamma-alumina support wherein the hydrogen pressure is $1.47 \times 10^7 – 1.96 \times 10^7$ Pa and the temperature is in the range of 250-330° C. After hydrogenation the reactor mixture may be flashed and further separated to recover hydrogenated resin material. In one embodiment, steam distillation may be used to separate the oligomers and is preferably conducted without exceeding 325° C. resin temperature.

The catalyst may comprise nickel and/or cobalt with one or more of molybdenum and/or tungsten on one or more of alumina or silica supports wherein the amount of nickel oxide and/or cobalt oxide on the support ranges from 2-10 wt %. The amount of tungsten or molybdenum oxide on the support after preparation ranges from 5-25 wt %. Preferably, the catalyst contains 4-7 wt % nickel oxide and 18-22 wt % tungsten oxide. This process and suitable catalysts are described in greater detail in U.S. Pat. No. 5,820,749. In another embodiment, the hydrogenation may be carried out using the process and catalysts described in U.S. Pat. No. 4,629,766. In particular, nickel-tungsten catalysts on gamma-alumina are preferred.

The oligomers may be stripped from the resin before hydrogenation and are preferably hydrogenated before grafting. The oligomers may also be hydrogenated with the resin and then stripped from the resin, yielding a hydrogenated resin and hydrogenated oligomers. At least some of the oligomers may be stripped before hydrogenation and at least some hydrogenated oligomers may be stripped after hydrogenation. The hydrogenated resin/oligomers product may be further processed together as a single mixture as described below. The oligomers may also be derived from any suitable source and hydrogenated (if necessary) before grafting so that the oligomers before grafting are typically at least partially hydrogenated and preferably substantially hydrogenated.

Grafting the Resin Material

At least a portion of the resulting resin material, preferably derived from a process such as that described above, may then be combined and/or contacted with a graft monomer, typically under suitable reaction conditions and in a suitable mixing device. The reaction is preferably conducted in the absence of significant shear. As previously described, the resin and oligomers may be grafted separately or simultaneously, and if separately, grafted oligomers may then be optionally remixed with the grafted resin, an ungrafted resin, or any another suitable resin, adhesive component or composition as described below.

Grafting of the graft monomer preferably occurs in the presence of a free-radical initiator selected from the group consisting of organic peroxides, organic per-esters, and azo compounds. Examples of such compounds include benzoyl peroxide, dichlorobenzoyl peroxide, dicumyl peroxide, di-tert-butyl peroxide, 2,5-dimethyl-2,5-di(peroxybenzoate) hexyne-3,1,4-bis(tert-butylperoxyisopropyl)benzene, lauroyl peroxide, tert-butyl peracetate, 2,5-dimethyl-2,5-di(tert-butylperoxy)hexyne-3,2,5-dimethyl-2,5-di(tert-butylperoxy)hexane, tert-butyl perbenzoate, tert-butylperphenyl acetate, tert-butyl perisobutyrate, tert-butyl per-sec-octoate, tert-butyl perpivalate, cumyl perpivalate, tert-butyl hydroperoxide, tert-butyl perdiethylacetate, azoisobutyronitrile, and dimethyl azoisobutyrate. The peroxide preferably has a half-life of about 6 minutes at 160° C. with volatile non-aromatic decomposition products and those that minimize color formation. Preferred peroxides include di-tert-butyl peroxide and 2,5 dimethyl-2,3-di(tert-butylperoxy)hexane. The amount of peroxide combined is typically dependent on the weight of the graft monomer. The weight ratio of the graft monomer:peroxide in the reaction mixture may be between 1 and 20, more preferably between about 1 and 10, more preferably between about 1 and about 5, and even more preferably about 4.

The graft monomers may be combined with the resin material at a temperature between 50-200° C., more preferably between 70-150° C., more preferably between 70-125° C., more preferably between 140-180° C., more preferably between 140-180° C., more preferably between 155-165° C. or between 165-175° C. and a pressure of typically one atmosphere but higher pressures can be used if necessary. In another preferred embodiment, the grafting reaction occurs at temperature greater than 90° C., more preferably between 90° C. and any temperature limit described above, more preferably between 90° C. and 150° C., more preferably between 90° C. and 145° C. In general, the lower limit of the reaction temperature is governed by the softening point of the resin as it is preferred to conduct the grafting reactions at temperatures above the softening point of the material to be grafted.

The graft monomer may be combined so that the weight ratio of graft monomer:resin material in the reaction mixture is less than 1, more preferably less than 0.5 more preferably less than 3:10 and more preferably less than 3:20. In a preferred embodiment, the reaction mixture is maintained in a homogenous state. The reaction mixture is preferably agitated or stirred vigorously. The free radical initiator is combined with the resin material-graft monomer reaction mixture either in one addition or preferably in a continuous or semi continuous mode during the reaction. Residence time in the reaction zone is preferably less than 75 minutes, more preferably less than 60 minutes, more preferably between 10-60 minutes, even more preferably between 30-60 minutes.

Where only the oligomers are grafted, the reaction temperature is preferably between 50-200° C., more preferably between 70-150° C., more preferably between 70-125° C., more preferably between 140-180° C., more preferably between 140-180° C., more preferably between 155-165° C., and more preferably about 160° C. In another embodiment the reaction temperature is 170-185° C. In another preferred embodiment, the grafting reaction occurs at temperature greater than 90° C., more preferably between 90° C. and any temperature limit described above, more preferably between 90° C. and 150° C., more preferably between 90° C. and 145° C. Other preferred ranges may include between any upper and lower temperature described in this paragraph.

The amount of graft monomer added is typically dependent on the amount of oligomer. Preferably, the oligomer:graft monomer mole ratio is between 5 and 0.2, more preferably between 2 and 0.5, more preferably between about 1.5 and 0.67 and more preferably about 1. Thereafter, the ungrafted oligomers are stripped from the product and optionally recycled to the reaction zone. The grafted oligomers produced generally have a softening point between 0-120° C., more preferably between 25-120° C., more preferably between 50-120° C. and even more preferably between 80-110° C. and color of 4-10 Gardner. Gardner color, as used herein, is measured using ASTM D-6166. The grafted oligomer product can then be recombined with the resin (grafted or ungrafted) from which it was derived or combined with other resins, polymers, and/or other materials and formulated into and adhesive material.

Where only the resin is grafted, the reaction temperature is preferably between 50-200° C., more preferably between 70-150° C., more preferably between 70-125° C., more preferably between 140-180° C., more preferably between 140-180° C., more preferably between 165-175° C., and more preferably about 170° C. In another embodiment, the grafting reaction preferably occurs between 170-185° C. In another preferred embodiment, the grafting reaction occurs at temperature greater than 90° C., more preferably between 90° C. and any upper temperature limit described above. The amount of graft monomer added is typically dependent on the amount of resin. The graft monomer:resin weight ratio in the reaction mixture is preferably less than 1:5, more preferably less than 1:10, more preferably less than 1:20, and even more preferably about 1:40. Generally, the grafting raises the softening point of the resin less than 10° C., more preferably less than 5° C. and produces a grafted resin having a color between 1-6 Gardner.

In another embodiment, the oligomers are not stripped from the resin product, and the resin and oligomers are simultaneously grafted. Reaction conditions are similar to those previously described for grafting the resin, but the graft monomer:resin material weight ratio is generally kept below 0.5, more preferably below 0.25 and more preferably below 3:20. Upon completion of grafting, the material may be further stripped if required to yield a resin of the desired softening point and/or to remove unreacted oligomers. Separation of the grafted oligomers from the grafted resin may also be made if desired, but the product may be used without such further processing. In many embodiments comprising grafted resin and grafted oligomers, the weight ratio of grafted oligomers:grafted resin in the resin material will be greater than 0.005, more preferably greater than 0.01, more preferably greater than 0.02, more preferably greater than 0.05, and more preferably greater than 0.1.

Grafting of the resin material can also be conducted via a solution route wherein the resin material dispersed in a solvent and combined, contacted and/or reacted with the graft monomer. Additionally or alternatively, the graft monomer can be dispersed in a solvent prior to adding to the resin material. These routes allow for lower reaction temperatures (as low as 80° C. or 100° C.) and allows the choice of different peroxides having half-lives of 6 minutes at the lower reaction temperatures. Suitable solvents include, but are not limited to, aliphatic solvents, cycloaliphatic solvents, aromatic solvents, and aromatic-aliphatic solvents. Typical examples include benzene, toluene, xylene, chlorobenzene, n-pentane, n-hexane, n-heptane, n-octane, n-decane, iso-heptane, iso-decane, iso-octane, cyclohexane, alkyl cyclohexane, and combinations of two or more thereof.

It is believed that the graft monomer is grafted to the resin material through an olefinic bond of the graft monomer such as an $\alpha, \beta$ olefinic bond. It is believed that by grafting the oligomers via this route, the formation of norbornyl ester groups in the grafted resin material is minimized and preferably avoided. Thus, the resulting grafted resin material is substantially free of norbornyl ester groups, i.e., it preferably contains less than 0.5 wt % norbornyl ester groups, more preferably less than 0.1 wt %, more preferably less than 0.05 wt %, more preferably less than 0.01 wt %. The resulting grafted oligomers and/or grafted resin are preferably at least one of a (i) a mono-alkyl succinic acid, anhydride or derivative thereof, or (ii) a $\beta$-alkyl substituted propanoic acid or derivative thereof. The reaction product of the resin material and graft monomer or the product of the combination of the resin material and the graft monomer may also include some oligomers of the graft monomer, which may or may not be removed before formulating a final composition.

The resulting grafted resin material preferably has a softening point between 15-210° C., more preferably 15-170° C., more preferably 65-140° C., more preferably 65-130° C., more preferably 80-120° C., more preferably 90-110° C., and more preferably between about 85-110° C. The grafted resin material preferably has a glass transition temperature (Tg) less than 120° C., more preferably less than 110° C., more preferably between 25-100° C., more preferably between 60-100° C., more preferably 60-80° C., and more preferably between 35-70° C. In one embodiment the Tg is preferably less than 50° C. Differential Scanning Calorimetry (DSC, ASTM D 341-88) was used to measure Tg. The resulting grafted resin material preferably has a Saponification number (mg KOH/g resin material) greater than 10, more preferably greater than 12, more preferably greater than 15, more preferably greater than 16, more preferably greater than 17, more preferably greater than 18, more preferably greater than 19, more preferably greater than 20, more preferably greater than 25. The resulting grafted resin material preferably has an acid number greater than 10, more preferably greater than 15, more preferably greater than 16, more preferably greater than 17, more preferably greater than 18, more preferably greater than 19, more preferably greater than 20, and more preferably greater than 25.

In one embodiment, the grafted resin material has an resin material:graft monomer molar ratio between 50 and 0.5, more preferably between 10 and 2, more preferably between 5 and 2, more preferably between 1.5 and 0.67, and more preferably about 1. In some embodiments, the weight ratio of graft monomer:resin in a grafted resin product is preferably less than 1, in other embodiments between 0.001 and 1, in other embodiments between 0.01 and 1, in other embodiments between 0.02 and 1, in other embodiments between 0.1 and 1, in other embodiments between 0.33 and 1, and in other embodiments between 0.01 and 0.3, and in other embodiments between 0.1 and 0.2.

Resin Blends

Resin blends may also be used. The blends comprise the grafted resin material described herein include both: (i) partially grafted resin material streams wherein only a portion of the resin material in a particular stream is grafted (resulting in a mixture of grafted an un-grafted resin material); and, (ii) blends of partially or fully grafted resin material streams with another tackifying resin. Suitable examples of other tackifying resins include: aliphatic hydrocarbon resins, at least partially hydrogenated aliphatic hydrocarbon resins, aliphatic/aromatic hydrocarbon resins, at least partially hydrogenated aliphatic aromatic hydrocarbon resins, cycloaliphatic hydrocarbon resins, at least partially hydrogenated cycloaliphatic resins, cycloaliphatic/aromatic hydrocarbon resins, at least partially hydrogenated cycloaliphatic/aromatic hydrocarbon resins, aromatic hydrocarbon resins, at least partially hydrogenated aromatic hydrocarbon resins, polyterpene resins, terpene-phenol resins, rosin esters, rosin acids, resins grafted with graft monomers, and mixtures of any two or more thereof. Suitable resins also include other resins having polar functionality whether produced by processes described herein or other suitable processes.

For example, one embodiment is a composition comprising between 0.1-99 wt % grafted resin material and between 1-99.9 wt % other resin. Other embodiments comprise between 0.1-50 wt % grafted resin material, between 0.1-30 wt % grafted resin material, between 0.1-20 wt % grafted resin material, between 1-25 wt % grafted resin material, between 1-15 wt % grafted resin material, between 1-10 wt % grafted resin material, between 5-10 wt % grafted resin material, and between 10-30 wt % grafted material.

In a preferred embodiment, the resin material comprises grafted resin and grafted oligomers in embodiments of between 0.1 and 50 wt % grafted oligomers, more preferably between 0.1 and 30 wt % grafted oligomers, more preferably between 0.1 and 20 wt % grafted oligomer, more preferably 0.1 and 10 wt % grafted oligomers, more preferably between 1 and 30 wt % grafted oligomers, more preferably between 1 and 20 wt % grafted oligomers, and more preferably between 1 and 10 wt % grafted oligomers based on the total weight of the resin material. Preferred ranges also include between any upper and lower limit described in this paragraph.

One blend is a composition comprising at least two hydrocarbon resins, wherein at least one of the resins is a grafted resin material grafted with a graft monomer and the other resin is an ungrafted petroleum hydrocarbon resin. "At least two hydrocarbon resins" also includes embodiments of hydrocarbon resins wherein only a portion of the overall resin molecules have been grafted with a graft monomer. While the base resin component may be the same, there are two resins— one grafted and one un-grafted resin within the resin composition. Such an embodiment may include at least two hydrocarbon resins wherein the base resin components are different, e.g. a $C_5/C_9$ resin and a grafted $CPD/C_9$ resin. Other examples include any combination of ungrafted resins and grafted resin materials described herein. For example, suitable petroleum hydrocarbon resins include: aliphatic hydrocarbon resins, at least partially hydrogenated aliphatic hydrocarbon resins, aliphatic/aromatic hydrocarbon resins, at least partially hydrogenated aliphatic aromatic hydrocarbon resins, cycloaliphatic hydrocarbon resins, at least partially hydrogenated cycloaliphatic resins, cycloaliphatic/aromatic hydrocarbon resins, at least partially hydrogenated cycloaliphatic/aromatic hydrocarbon resins, aromatic hydrocarbon resins, at least partially hydrogenated aromatic hydrocarbon resins, polyterpene resins, rosin esters, and terpene-phenol resins.

Secondary Rubber Component

A secondary rubber component, or "general purpose rubber" component may be present in compositions and end use articles. These rubbers may be blended by any suitable means with the elastomer or elastomer composition. These rubbers include, but are not limited to, natural rubbers, polyisoprene rubber, poly(styrene-co-butadiene) rubber (SBR), polybutadiene rubber (BR), poly(isoprene-co-butadiene) rubber (IBR), styrene-isoprene-butadiene rubber (SIBR), ethylene-propylene rubber (EPR), ethylene-propylene-diene rubber (EPDM), polysulfide, nitrile rubber, propylene oxide polymers, star-branched butyl rubber and halogenated star-branched butyl rubber, brominated butyl rubber, chlorinated butyl rubber, star-branched polyisobutylene rubber, star-branched brominated butyl (polyisobutylene/isoprene copolymer) rubber; poly(isobutylene-co-p-methylstyrene) and halogenated poly(isobutylene-co-p-methylstyrene), such as, for example, terpolymers of isobutylene derived units, p-methylstyrene derived units, and p-bromomethylstyrene derived units, poly(isobutylene-co-isoprene-co-p-methylstyrene), halogenated poly(isobutylene-co-isoprene-co-p-methylstyrene), poly(isobutylene-co-isoprene-co-styrene), halogenated poly(isobutylene-co-isoprene-co-styrene), poly(isobutylene-co-isoprene-co-α-methylstyrene) halogenated poly(isobutylene-co-isoprene-co-α-methylstyrene), and mixtures thereof.

Natural rubbers are described in detail by Subramaniam in RUBBER TECHNOLOGY 179-208 (Maurice Morton, ed., Chapman & Hall 1995). Desirable embodiments of the natural rubbers are selected from Malaysian rubber such as SMR CV, SMR 5, SMR 10, SMR 20, and SMR 50 and mixtures thereof, wherein the natural rubbers have a Mooney viscosity at 100° C. (ML 1+4) of 30 to 120, more preferably from 40 to 65. The Mooney viscosity test referred to herein is in accordance with ASTM D-1646. The natural rubber is preferably present in the composition from 5 to 40 phr, more preferably 5 to 25 phr, and more preferably 10 to 20 phr, wherein a preferred range of natural rubber may be any upper phr limit combined with any lower phr limit described herein.

Polybutadiene (BR) rubber is another suitable secondary rubber. The Mooney viscosity of the polybutadiene rubber as measured at 100° C. (ML 1+4) may range from 35 to 70, more preferably 40 to 65, more preferably 45 to 60. Some commercial examples of useful synthetic rubbers are NATSYN™ (Goodyear Chemical Company), and BUDENE™ 1207 or BR 1207 (Goodyear Chemical Company). A desirable rubber is high cis-polybutadiene (cis-BR). By "cis-polybutadiene" or "high cis-polybutadiene", it is meant that 1,4-cis polybutadiene is used, wherein the amount of cis component is at least 95%. An example of high cis-polybutadiene is BUDENE™ 1207.

Rubbers of ethylene and propylene derived units such as EPR and EPDM are also suitable as secondary rubbers. Examples of suitable comonomers in making EPDM are ethylidene norbornene, 1,4-hexadiene, dicyclopentadiene, as well as others. These rubbers are described in RUBBER TECHNOLOGY 260-283 (1995). A suitable ethylene-propylene rubber is commercially available as VISTALON® (ExxonMobil Chemical Company, Houston Tex.).

The secondary rubber may also be a halogenated rubber as part of a terpolymer composition. The halogenated butyl rubber may be a brominated butyl rubber or a chlorinated butyl rubber. General properties and processing of halogenated butyl rubbers are described in THE VANDERBILT RUBBER HANDBOOK 105-122 (Robert F. Ohm ed., R.T. Vanderbilt Co., Inc. 1990), and in RUBBER TECHNOLOGY 311-321 (1995). Butyl rubbers, halogenated butyl rubbers, and star-branched butyl rubbers are described by Edward Kresge and H. C. Wang in 8 KIRK-OTHMER ENCYCLOPEDIA OF CHEMICAL TECHNOLOGY 934-955 (John Wiley & Sons, Inc. 4th ed. 1993).

The secondary rubber component may include, but is not limited to, at least one or more of brominated butyl rubber, chlorinated butyl rubber, star-branched polyisobutylene rubber, star-branched brominated butyl (polyisobutylene/isoprene copolymer) rubber; halogenated poly(isobutylene-co-p-methylstyrene), such as, for example, terpolymers of isobutylene derived units, p-methylstyrene derived units, and p-bromomethylstyrene derived units, and the like halomethylated aromatic interpolymers as in U.S. Pat. No. 5,162,445; U.S. Pat. No. 4,074,035; and U.S. Pat. No. 4,395,506; halogenated isoprene and halogenated isobutylene copolymers, polychloroprene, and the like, and mixtures of any of the above. Some embodiments of the halogenated rubber component are also described in U.S. Pat. No. 4,703,091 and U.S. Pat. No. 4,632,963.

The secondary rubber component of the elastomer composition may be present in a range from up to 90 phr in one embodiment, from up to 50 phr in another embodiment, from up to 40 phr in another embodiment, and from up to 30 phr in yet another embodiment. In yet another embodiment, the secondary rubber is present from at least 2 phr, and from at least 5 phr in another embodiment, and from at least 5 phr in yet another embodiment, and from at least 10 phr in yet another embodiment. Preferred ranges also include any combination of any upper phr limit and any lower phr limit. For example, the secondary rubber, either individually or as a blend of rubbers such as, for example NR, may be present from 5 phr to 40 phr in one embodiment, and from 8 to 30 phr in another embodiment, and from 10 to 25 phr in yet another embodiment, and from 5 to 25 phr in yet another embodiment, and from 5 to 15 phr in yet another embodiment, wherein a desirable range of NR may be any combination of any upper phr limit with any lower phr limit.

The elastomeric composition may have one or more filler components such as, for example, calcium carbonate, silica, clay and other silicates which may or may not be exfoliated, talc, titanium dioxide, and carbon black. In one embodiment, the filler is carbon black or modified carbon black, and combinations thereof. The filler may also be a blend of carbon black and silica. A preferred filler for such articles as tire treads and sidewalls is reinforcing grade carbon black present from 10 to 100 phr, more preferably 20 to 90 phr, more preferably 30 to 80 phr, more preferably 40 to 80 phr, and more preferably 50 to 80 phr, wherein a preferred range of carbon black may be any upper phr limit combined with any lower phr limit described herein. Useful grades of carbon black, as described in RUBBER TECHNOLOGY, 59-85, range from N110 to N990. More desirably, embodiments of the carbon black useful in, for example, tire treads are N229, N351, N339, N220, N234 and N110 provided in ASTM (D3037, D1510, and D3765). Embodiments of the carbon black useful in, for example, sidewalls in tires, are N330, N351, N550, N650, N660, and N762. Carbon blacks suitable for innerliners and other air barriers include N550, N660, N650, N762, N990 and Regal 85.

When clay is present as a filler, it may be a swellable clay in one embodiment, which may or may not be exfoliated or partially exfoliated using an exfoliating agent. Suitable swellable clay materials include natural or synthetic phyllosilicates, particularly smectic clays such as montmorillonite, nontronite, beidellite, volkonskoite, laponite, hectorite, saponite, sauconite, magadite, kenyaite, stevensite and the like, as well as vermiculite, halloysite, aluminate oxides, hydrotalcite and the like. These swellable clays generally comprise particles containing a plurality of silicate platelets having a thickness of 8-12 Å, and contain exchangeable cations such as $Na^+$, $Ca^{+2}$, $K^+$ or $Mg^{+2}$ present at the interlayer surfaces. They may also be surface treated (or modified) with intercalant surfactants or materials such as alkyl, ammonium salts.

The swellable clay may be exfoliated by treatment with organic molecules (swelling or exfoliating "agents" or "additives") capable of undergoing ion exchange reactions with the cations present at the interlayer surfaces of the layered silicate. Suitable exfoliating agents include cationic surfactants such as ammonium, alkylamines or alkylammonium (primary, secondary, tertiary and quaternary), phosphonium or sulfonium derivatives of aliphatic, aromatic or arylaliphatic amines, phosphines and sulfides. Desirable amine compounds (or the corresponding ammonium ion) are those with the structure $R^2R^3R^4N$, wherein $R^2$, $R^3$, and $R^4$ are $C_1$ to $C_{30}$ alkyls or alkenes in one embodiment, $C_1$ to $C_{20}$ alkyls or alkenes in another embodiment, which may be the same or different. In one embodiment, the exfoliating agent is a so called long chain tertiary amine, wherein at least $R^2$ is a $C_{14}$ to $C_{20}$ alkyl or alkene.

The fillers may be any size and typically range, for example, from about 0.0001 μm to about 100 μm. As used herein, silica is meant to refer to any type or particle size silica or another silicic acid derivative, or silicic acid, processed by solution, pyrogenic or the like methods and having a surface area, including untreated, precipitated silica, crystalline silica, colloidal silica, aluminum or calcium silicates, fumed silica, and the like.

One or more crosslinking agents are preferably used in the elastomeric compositions, especially when silica is the primary filler, or is present in combination with another filler. More preferably, the coupling agent may be a bifunctional organosilane crosslinking agent. An "organosilane crosslinking agent" is any silane coupled filler and/or crosslinking activator and/or silane reinforcing agent known to those skilled in the art including, but not limited to, vinyl triethoxysilane, vinyl-tris-(beta-methoxyethoxy)silane, methacryloylpropyltrimethoxysilane, gamma-amino-propyl triethoxysilane (sold commercially as A1100 by Witco), gamma-mercaptopropyltrimethoxysilane (A189 by Witco) and the like, and mixtures thereof. In one embodiment, bis-(3-triethoxysilypropyl)tetrasulfide (sold commercially as Si69 by Degussa) is employed.

A processing aid may also be present in the composition. Processing aids include, but are not limited to, plasticizers, tackifiers, extenders, chemical conditioners, homogenizing agents and peptizers such as mercaptans, petroleum and vulcanized vegetable oils, mineral oils, paraffinic oils, polybutene oils, naphthenic oils, aromatic oils, waxes, resins, rosins, and the like. The aid is typically present from 1 to 70 phr in one embodiment, from 3 to 60 phr in another embodiment, and from 5 to 50 phr in yet another embodiment. Some commercial examples of processing aids are SUNDEX™ (Sunoco), an aromatic processing oil, SUNPAR™ (Sunoco), a paraffinic processing oil, PARAPOL™ (ExxonMobil Chemical Company), a polybutene liquid polymer having a number average molecular weight of 800 to 3000, and FLEXON™ (ExxonMobil Chemical Company), a paraffinic petroleum oil. Commercial examples of these include, for example, FLEXON oils (which contain some aromatic moieties) and CALSOL™ (Calumet Lubricants), a naphthenic processing oil.

The compositions typically contain other components and additives customarily used in rubber mixes, such as effective amounts of other nondiscolored and nondiscoloring processing aids, pigments, accelerators, crosslinking and curing materials, antioxidants, antiozonants. General classes of accelerators include amines, diamines, guanidines, thioureas, thiazoles, thiurams, sulfenamides, sulfenimides, thiocarbamates, xanthates, and the like. Crosslinking and curing agents include sulfur, zinc oxide, and fatty acids. Peroxide cure systems may also be used. The components, and other curatives, are typically present from 0.1 to 10 phr in the composition.

Generally, polymer blends, for example, those used to produce tires, are crosslinked. It is known that the physical properties, performance characteristics, and durability of vulcanized rubber compounds are directly related to the number (crosslink density) and type of crosslinks formed during the vulcanization reaction. (See, e.g., Helt et al., *The Post Vulcanization Stabilization for NR* in RUBBER WORLD, 18-23 (1991)). Generally, polymer blends may be crosslinked by adding curative molecules, for example sulfur, metal oxides, organometallic compounds, radical initiators, etc., followed by heating. In particular, the following metal oxides are common useful curatives: $ZnO$, $CaO$, $MgO$, $Al_2O_3$, $CrO_3$, $FeO$, $Fe_2O_3$, and $NiO$. These metal oxides can be used alone or in conjunction with the corresponding metal fatty acid complex (e.g., zinc stearate, calcium stearate, etc.), or with the organic and fatty acids added alone, such as stearic acid, and optionally other curatives such as sulfur or a sulfur compound, an alkylperoxide compound, diamines or derivatives thereof (e.g., DIAK products sold by DuPont). (See also, *Formulation Design and Curing Characteristics of NBR Mixes for Seals*, RUBBER WORLD 25-30 (1993)). This method of curing elastomers may be accelerated and is often used for the vulcanization of elastomer blends.

The acceleration of the cure process may be accomplished by adding to the composition an amount of an accelerant, often an organic compound. The mechanism for accelerated vulcanization of natural rubber involves complex interactions between the curative, accelerator, activators and polymers. Ideally, all the available curative is consumed in the formation of effective crosslinks that join together two polymer chains and enhance the overall strength of the polymer matrix. Numerous accelerators are known in the art and include, but are not limited to, the following: stearic acid, diphenyl guanidine (DPG), tetramethylthiuram disulfide (TMTD), 4,4'-dithiodimorpholine (DTDM), tetrabutylthiuram disulfide (TBTD), benzothiazyl disulfide (MBTS), hexamethylene-1, 6-bisthiosulfate disodium salt dihydrate (sold commercially as DURALINK™ HTS by Flexsys), 2-(morpholinothio) benzothiazole (MBS or MOR), blends of 90% MOR and 10% MBTS (MOR 90), N-tertiarybutyl-2-benzothiazole sulfenamide (TBBS), and N-oxydiethylene thiocarbamyl-N-oxydiethylene sulfonamide (OTOS), zinc 2-ethyl hexanoate (ZEH), and "thioureas".

The materials included in the air barriers and air barrier compositions are mixed by conventional means known to those skilled in the art, in a single step or in stages. In one embodiment, the carbon black is added in a different stage from zinc oxide and other cure activators and accelerators. In another embodiment, antioxidants, antiozonants and processing materials are added in a stage after the carbon black has been processed with the elastomeric composition, and zinc oxide is added at a final stage to maximize compound modulus. Thus, a two to three (or more) stage processing sequence is preferred. Additional stages may involve incremental additions of filler and processing oils.

The compositions may be vulcanized by subjecting them using heat or radiation according to any conventional vulcanization process. Typically, the vulcanization is conducted at a temperature ranging from about 100° C. to about 250° C. in one embodiment, from 150° C. to 200° C. in another embodiment, for about 1 to 150 minutes.

Suitable elastomeric compositions for such articles as air barriers, and more particularly tire curing bladders, innerliners, tire innertubes, and air sleeves, including gaskets and ring structures, may be prepared by using conventional mixing techniques including, for example, kneading, roller milling, extruder mixing, internal mixing (such as with a Banbury™ or Brabender™ mixer) etc. The sequence of mixing and temperatures employed are well known to the skilled rubber compounder, the objective being the dispersion of fillers, activators and curatives in the polymer matrix without excessive heat buildup. A useful mixing procedure utilizes a Banbury™ mixer in which the copolymer rubber, carbon black, non-black fillers, and plasticizer are added and the composition mixed for the desired time or to a particular temperature to achieve adequate dispersion of the ingredients. Alternatively, the rubber and a portion of the carbon black (e.g., one-third to two thirds) is mixed for a short time (e.g., about 1 to 3 minutes) followed by the remainder of the carbon black and oil. Mixing is continued for about 1 to 10 minutes at high rotor speed during which time the mixed components reach a temperature of about 140° C. Following cooling, the components are mixed in a second step on a rubber mill or in a Banbury™ mixer during which the curing agent and optional accelerators, are thoroughly and uniformly dispersed at relatively low temperature, for example, about 80° C. to about 105° C., to avoid premature curing of the composition. Variations in mixing will be readily apparent to those skilled in the art. The mixing is performed to disperse all components of the composition thoroughly and uniformly.

An innerliner stock is then prepared by calendering the compounded rubber composition into sheet material having a thickness of roughly 40 to 80 mil gauge and cutting the sheet material into strips of appropriate width and length for innerliner applications.

The sheet stock at this stage of the manufacturing process is a sticky, uncured mass and is therefore subject to deformation and tearing as a consequence of handling and cutting operations associated with tire construction.

The innerliner is then ready for use as an element in the construction of a pneumatic tire. The pneumatic tire is composed of a layered laminate comprising an outer surface which includes the tread and sidewall elements, an intermediate carcass layer which comprises a number of plies containing tire reinforcing fibers, (e.g., rayon, polyester, nylon or metal fibers) embedded in a rubbery matrix and an innerliner layer which is laminated to the inner surface of the carcass layer. Tires are normally built on a tire forming drum using the layers described above. After the uncured tire has been built on the drum, the uncured tire is placed in a heated mold having an inflatable tire shaping bladder to shape it and heat it to vulcanization temperatures by methods well known in the art. Vulcanization temperatures generally range from about 100° C. to about 250° C., more preferably from 125° C. to 200° C., and times may range from about one minute to several hours, more preferably from about 5 to 30 minutes. Vulcanization of the assembled tire results in vulcanization of all elements of the tire assembly, for example, the innerliner, the carcass and the outer tread/sidewall layers and enhances the adhesion between these elements, resulting in a cured, unitary tire from the multi-layers.

Preferred Properties

Generally, cured compositions disclosed herein preferably have a brittleness value less than −36° C., more preferably less than −37° C., more preferably less than −38° C., more preferably less than −39° C., more preferably less than −40° C., more preferably less than −41° C. and even more preferably less than −42° C.

Further, the air permeability improved (decreased) upon addition of the resin. Cured compositions preferably have an air permeability less than $4.0 \times 10^{-8}$ $cm^3 \cdot cm/cm^2 \cdot sec \cdot atm$, more preferably less than $3.5 \times 10^{-8}$ $cm^3 \cdot cm/cm^2 \cdot sec \cdot atm$, more preferably less than $3.0 \times 10^{-8}$ $cm^3 \cdot cm/cm^2 \cdot sec \cdot atm$, and even more preferably less than $2.5 \times 10^{-8}$ $cm^3 \cdot cm/cm^2 \cdot sec \cdot atm$.

The uncured compositions preferably have a green tack above 0.5 N/mm, more preferably above (3 lbs./in) 0.53 N/mm, more preferably above (3.1 lbs./in) 0.54 N/mm, more preferably above (3.2 lbs./in) 0.56 N/mm, more preferably above (3.3 lbs./in) 0.58 N/mm, more preferably above (3.4 lbs./in) 0.60 N/mm, more preferably above (3.5 lbs./in) 0.61 N/mm, more preferably above (4.0 lbs./in) 0.70 N/mm, and even more preferably above (4.25 lbs./in) 0.74 N/mm. Acceptable ranges of green tack may include any of the values listed in this paragraph as upper and/or lower limits.

The composition can be used to make any number of articles. In one embodiment, the article is selected from tire curing bladders, innerliners, tire innertubes, and air sleeves.

Other useful goods that can be made using compositions include hoses, seals, molded goods, cable housing, and other articles disclosed in THE VANDERBILT RUBBER HANDBOOK 637-772 (R.T. Vanderbilt Company, Inc. 1990).

EXAMPLES

The present invention, while not meant to be limiting by, may be better understood by reference to the following example and Tables.

Properties and Test Methods

Cure properties were measured using an ODR 2000 at the indicated temperature and 3.0 degree arc. Test specimens were cured at the indicated temperature, typically from 150° C. to 170° C., for a time (in minutes) corresponding to T90+ appropriate mold lag. When possible, standard ASTM tests were used to determine the cured compound physical properties. Stress/strain properties (tensile strength, elongation at break, modulus values, energy to break) were measured at room temperature using an Instron 4202 or Instron 4204. Shore A hardness was measured at room temperature by using a Zwick Duromatic.

Oxygen permeability was measured using a MOCON OxTran Model 2/61 operating under the principle of dynamic measurement of oxygen transport through a thin film as published by R. A. Pasternak et al. in 8 JOURNAL OF POLYMER SCIENCE: PART A-2 467 (1970). Generally, the method is as follows: flat film or rubber samples are clamped into diffusion cells that are purged of residual oxygen using an oxygen free carrier gas at 60° C. The carrier gas is routed to a sensor until a stable zero value is established. Pure oxygen or air is then introduced into the outside of the chamber of the diffusion cells. The oxygen diffusing through the film to the inside chamber is conveyed to a sensor, which measures the oxygen diffusion rate.

Air permeability was tested by the following method. Thin, vulcanized test specimens from the sample compositions were mounted in diffusion cells and conditioned in an oil bath at 65° C. and 48 psi (331 kPa). The time required for air to permeate through a given specimen is recorded to determine its air permeability. Test specimens were circular plates with 12.7-cm diameter and 0.38-mm thickness. The error ($2\sigma$) in measuring air permeability is $\pm 0.245$ ($\times 10^8$) units.

Pierced DeMattia flex measurements at 25 and 70° C. of the unaged samples were performed according to ASTM D-813-87 under the conditions of 300 cycles/min and 60° bend.

The "adhesion to SBR" or "adhesion T-peel" test is based on ASTM D 413. This test is used to determine the adhesive bond strength between two rubber compounds, the same or different, after curing. Cured adhesion tests were carried out at 100° C. and at a peeling speed of 2 inches (5 cm)/min. Generally, the compounds used to make up the rubber (elastomeric) compositions are prepared on a three-roll mill, or calender, to a thickness of 2.5 mm. An adhesive backing fabric is placed on the back of each compound. Typically, approximately 500 grams of stock blended elastomeric composition yields 16 samples which is enough for 8 adhesion tests in duplicate, wherein the calender is set to 2.5 mm guides spaced 11 cm apart. The face of the two compounds are pressed and bonded to one another. A small Mylar tab is placed between the two layers of rubber compositions (SBR and test composition) on one end to prevent adhesion, and to allow approximately 2.5 inches (6.35 cm) of tab area. The samples are then cure bonded in a curing press at the specified conditions. One inch (2.54 cm)×6 inch (15.24 cm) specimens are die-cut from each molded vulcanized piece. The tab of each specimen is held by a powered driven tensioning machine (Instron 4104, 4202, or 1101) and pulled at a 180° angle until separation between the two rubber compositions occurs. The force to obtain separation and observations on the torn specimens are reported. Other test methods are summarized in Table 2.

TABLE 2

Test Methods

| Parameter | Units | Test |
|---|---|---|
| Mooney Viscosity (BIMS polymer) | ML 1 + 8, 125° C., MU | ASTM D 1646 (modified) |
| Mooney Viscosity (composition) | ML 1 + 4, 100° C., MU | ASTM D 1646 |
| Air permeability | cm$^3$-cm/cm$^2$-sec-atm | See text |
| Brittleness | ° C. | ASTM D 746 |
| Green Strength (100% Modulus) | PSI | ASTM D 412 |
| Mooney Viscosity (compound) | ML 1 + 4, 100° C., MU | ASTM D 1646 |
| Mooney Scorch Time Oscillating Disk Rheometer (ODR) @ 160° C., ±3° arc | T$_S$5, 125° C., minutes | ASTM D 1646 |
| ML | deciNewton · meter | ASTM D 2084 |
| MH | dNewton · m | |
| T$_S$2 | minute | |
| T$_C$90 | minute | |
| Cure rate | dN · m/minute | |
| Physical Properties press cured Tc 90 + 2 min @ 160° C. | | |
| Hardness | Shore A | ASTM D 2240 |
| Modulus 100% | MPa | ASTM D 412 |
| Tensile Strength | MPa | Die B, C |
| Elongation at Break | % | |
| Hot Air Aging, 72 hrs. @ 125° C. | | |
| Hardness Change | % | ASTM D 573 |
| Tensile Change | % | |
| Elongation Change | % | |
| Weight Change | % | |
| Tear Strength Die B & Die C | N/mm | ASTM D 624 |
| Fatigue-to-Failure | cycles | ASTM D 4482 using Cam 24 (136% extension) |

The error ($2\sigma$) in the later measurement is $\pm 0.65$ Mooney viscosity units. The average stress/strain value of at least three specimens is reported. The error ($2\sigma$) in tensile measurements is $\pm 0.47$ MPa units. The error in the fatigue-to-failure values is $\pm 20\%$. The error ($2\sigma$) in measuring 100% Modulus is $\pm 0.11$ MPa units; the error ($2\sigma$) in measuring elongation is $\pm 13\%$ units.

The components of the blends used in the Examples are shown in Tables 3 and 4.

Examples 1-6

Examples 1-6 use a formulation of 100 phr Bromobutyl 2222. Other components and their amounts for each Example are shown in Table 5. Examples 1-4 are comparative examples using conventional tackifiers or no resin at all. Example 5 used EMFR 100. Example 6 used EMFR 100A. The examples were all tested for various physical properties, the results of which are outlined in Tables 6-7.

These components were mixed in a Banbury mixer in the absence of zinc oxide, MBTS and sulfur at a temperature of 65° C., mixed for about 5-10 minutes and discharged at about 150° C. Following cooling, the components were mixed in a second step on a two-roll rubber mill during which the curing agent and accelerator (zinc oxide, MBTS and sulfur) were thoroughly and uniformly dispersed at a relatively low temperature, e.g., 80° C. to 105° C. The final, green compounds, if required, were sheeted one more time on the two-roll mill. To measure cured properties, these compound compositions were cured at 150° C. for 20 minutes. The mixing was performed to disperse all components of the composition thoroughly and uniformly.

Self-tack and tack to carcass were performed as follows. Each compound was cold-molded to avoid premature crosslinking crosslinking (100° C., 3 minutes at 8 metric tons followed by 2 minutes at 8 metric tons). The molded sample was 4×4×0.04 inches (10.16×10.16 cm×0.1 cm). All tack samples were reinforced with a cloth backing during the second molding step described above. Tack bonds were formed with a 4.5 lb. (2.04 kg) roller rolled twice. T-peel measurements were carried out in an Instron testing machine at room temperature and at a crosshead speed of 2 inches (5.08 cm)/min. Three specimens were tested with average shown in the Tables 5-7. For aged tack, the molded specimens were directly exposed to air for 6 days prior to testing. During this 6-day period, they were stored in a covered container to avoid dust.

The carcass formulations were produced in two mixing stages in a Banbury mixer. The first stage mixed 70 parts natural rubber, 30 parts SBR 1502 (styrene butadiene rubber containing 23.5% bound styrene and no oil, available from Goodyear Tire & Rubber Co., Houston, Tex.), 50 parts N660 carbon black, 10 parts CALSOL 810 processing oil, 5 parts Escorez® 1102 hydrocarbon resin, 1 part each of stearic acid and TMQ and 3 parts zinc oxide. After mixing the above components in a BR Banbury internal mixer for about five minutes, the compound was removed from the mixer and formed into a sheet on a two-roll mill, then cooled to room temperature. The sheeted compound was then placed back on the two-roll mill and 2 parts sulfur and 1 part TBBS were added to the compound using rolls and cross cuts to form the carcass.

Examples 5 and 6 show that compared to Comparative Example 1, improved (reduced) air permeability is obtained. Improved (longer) scorch safety (MS T-3, T-5, T-10 and T-20) is obtained with improved (shorter) cure times (T-90). Cured physical properties (Hardness, Modulus, Tensile, Elongation, Brittleness) are not affected. Improved fatigue properties (Aged Fatigue-to-Failure, Tear Die-B and Die-C) are obtained. Examples 5 and 6 show that compared to Examples 2 and 3, improved (longer) scorch safety (MS T-3, T-5, T-10 and T-20) is obtained, with other cure and cured physical properties maintained. As noted from Tables 6-7, Examples 5 and 6 show brittleness temperatures lower or close to Comparative Examples 1-4 (recipes containing conventional resins). Overall, Examples 5 and 6 also have good balance in other performance, such as air impermeability, self-tack, tack to carcass, green strength, cure characteristics, cured adhesion, tensile properties, tear, etc., as detailed in Tables 6-7.

TABLE 3

Components and Commercial Sources

| Component | Brief Description | Commercial Source |
|---|---|---|
| Bromobutyl 2222 | Brominated isobutylene-isoprene copolymer, 2 wt % Br | ExxonMobil Chemical Company (Houston, TX) |
| PARAPOL ™ 1300 | Polybutene Oil | ExxonMobil Chemical Company (Houston, TX) |
| KADOX ™ 911 | High Purity French Process Zinc Oxide | Zinc Corp. of America (Monaca, Pa) |
| stearic acid | Cure agent | e.g., C. K. Witco Corp. (Taft, LA) |
| sulfur | cure agent | e.g., R. E. Carroll (Trenton, NJ) |
| CALSOL ™ 810 | Naphthenic petroleum oil | Calumet Lubricants Company (Indianapolis, IN) |
| Maglite K | Magnesium oxide | C. P. Hall (Chicago, IL) |
| Struktol 40 MS | Mixture of dark aromatic hydrocarbon resins having a softening point between 50-60° C. and a specific gravity of 1.02. | Struktol Co. of America (Stow, OH) |
| MBTS | 2-mercaptobenzothiazole disulfide | R. T. Vanderbilt (Norwalk, CT) or Elastochem (Chardon, OH) |

TABLE 4

Resin Components

| Resin | Description | Source |
|---|---|---|
| SP 1068 | Phenolic resin having a softening point-90° C., Tg-53° C., and Mn-850 | Schenectady Chemicals (Schenectady, NY) |
| Rosin Oil MR-1085 A | Resin, including unsaturated cyclic carboxylic acids, Tg-7° C., Mn-300 | Arizona Chemical Company (Panama City, FL) |
| Escorez® 1102 | C₅ aliphatic hydrocarbon resin having a softening point of 100° C., Tg-50° C., Mn-750 | ExxonMobil Chemical Company (Houston, TX) |
| EMFR-100 | Hydrogenated thermally polymerized aromatic containing di-cyclopentadiene hydrocarbon resin grafted with maleic anhydride (Mn-214, Mw/Mn 2.3, Saponification No. 24, 2.55 wt % maleic anhydride content, softening point 98° C.) | ExxonMobil Chemical Company (Houston, TX) |
| EMFR-100A | Resin Composition comprising 95 wt % hydrogenated thermally polymerized aromatic containing di-cyclopentadiene hydrocarbon resin (available as Escorez 5600) and 5 wt % oligomers (full boiling range) derived from production of Escorez 5600, grafted with maleic anhydride | ExxonMobil Chemical Company (Houston, TX) |

TABLE 4-continued

Resin Components

| Resin | Description | Source |
|---|---|---|
| | (softening point 98° C., Saponification No. 21.26, Gardner Color 4.4) | |

TABLE 5

Components for Examples 1-6

| Component (parts by weight) | Example 1 | Example 2 | Example 3 | Example 4 | Example 5 | Example 6 |
|---|---|---|---|---|---|---|
| Bromobutyl-2222 | 100 | 100 | 100 | 100 | 100 | 100 |
| CARBON BLACK-N-660 | 60.0 | 60.0 | 60.0 | 60.0 | 60.0 | 60.0 |
| Calsol-810 | 8.0 | | | | | |
| Stearic Acid | 2.0 | 2.0 | 2.0 | 2.0 | 2.0 | 2.0 |
| Maglite-K | 0.15 | 0.15 | 0.15 | 0.15 | 0.15 | 0.15 |
| SP-1068 | 4.0 | 4.0 | | | | |
| Struktol 40MS | 7.0 | 7.0 | 7.0 | 7.0 | 7.0 | 7.0 |
| Parapol-1300 | | 8.0 | 8.0 | 8.0 | 8.0 | 8.0 |
| MR-1085A | | | 4.0 | | | |
| Escorez 1102 | | | | 4.0 | | |
| EMFR 100 | | | | | 4.0 | |
| EMFR 100A | | | | | | 4.0 |
| Kadox-911 | 3.00 | 3.00 | 3.00 | 3.00 | 3.00 | 3.00 |
| Altax-(MBTS) | 1.50 | 1.50 | 1.50 | 1.50 | 1.50 | 1.50 |
| SULFUR | 0.50 | 0.50 | 0.50 | 0.50 | 0.50 | 0.50 |
| TOTAL Parts | 186.15 | 186.15 | 186.15 | 186.15 | 186.15 | 186.15 |

TABLE 6

Results for Examples 1-6

| | Example 1 | Example 2 | Example 3 | Example 4 | Example 5 | Example 6 |
|---|---|---|---|---|---|---|
| MOONEY SCORCH 135° C. MINUTES TO POINT RISE | | | | | | |
| T-3 | 14.20 | 13.88 | 12.22 | 22.00 | 18.90 | 20.15 |
| T-5 | 16.48 | 16.37 | 14.38 | 25.25 | 22.02 | 23.15 |
| T-10 | 19.22 | 19.47 | 16.65 | 29.15 | 25.57 | 26.57 |
| T-20 | 21.68 | 22.25 | 18.57 | 32.47 | 28.50 | 29.55 |
| MOONEY VISCOSITY (ML) 100° C. | | | | | | |
| MINUTES READING (1 + 4) | 54.0 | 56.2 | 54.9 | 56.0 | 55.5 | 57.0 |
| ODR ARC 3° TEMP. 160° C. MINUTE MOTOR 60 | | | | | | |
| MIN-MAX | 24.23 | 24.23 | 15.16 | 21.69 | 20.96 | 21.84 |
| M-L | 8.49 | 9.30 | 8.70 | 9.14 | 8.75 | 9.15 |
| M-H | 32.72 | 31.49 | 23.86 | 30.83 | 29.71 | 30.99 |
| TS-2 | 3.22 | 3.06 | 2.89 | 4.24 | 3.52 | 3.73 |
| Tc-25 | 5.12 | 5.04 | 3.71 | 6.78 | 5.65 | 5.97 |
| Tc-50 | 8.08 | 8.09 | 5.08 | 10.05 | 8.67 | 9.06 |
| Tc-90 | 32.80 | 26.17 | 17.44 | 20.17 | 27.09 | 25.04 |
| RATE | 2.52 | 2.11 | 2.85 | 1.79 | 1.97 | 1.99 |
| HARDNESS, SHORE A | | | | | | |
| UNAGED | 56 | 57 | 61 | 57 | 55 | 54 |
| AGED 72 Hrs. @ 125° C. | 62 | 58 | 60 | 58 | 58 | 58 |
| TENSILES UNAGED TEST @ R.T. T-90 + 2 @ 160° C. | | | | | | |
| 100% MODULUS, MPa | 1.21 | 1.12 | 1.15 | 1.18 | 1.08 | 1.17 |
| 200% MODULUS, MPa | 2.33 | 2.12 | 1.88 | 2.34 | 2.05 | 2.20 |
| 300% MODULUS, MPa | 3.61 | 3.37 | 2.89 | 3.75 | 3.28 | 3.47 |
| TENSILE, MPa | 9.20 | 9.87 | 7.96 | 9.89 | 8.97 | 9.50 |
| ELONGATION, % | 781 | 822 | 760 | 756 | 786 | 784 |
| TENSILES AGED TEST @ R.T. T-90 + 2 @ 160° C. 72 Hrs. @ 125° C. | | | | | | |
| 100% MODULUS, MPa | 2.52 | 2.06 | 1.97 | 1.91 | 1.79 | 1.80 |
| 200% MODULUS, MPa | 4.68 | 3.97 | 3.55 | 3.82 | 3.50 | 3.51 |
| 300% MODULUS, MPa | 6.27 | 5.51 | 5.02 | 5.44 | 4.95 | 5.06 |
| TENSILE, MPa | 8.11 | 8.60 | 8.82 | 9.91 | 9.74 | 9.49 |
| ELONGATION, % | 542 | 592 | 701 | 692 | 721 | 695 |

TABLE 7

Results for Examples 1-6

| | Example | | | | | |
|---|---|---|---|---|---|---|
| | 1 | 2 | 3 | 4 | 5 | 6 |
| FATIGUE TO FAILURE | | | | | | |
| kcycles | 162 | 227 | 565 | 210 | 129 | 93 |
| AGED 72 Hrs. @ 125° C. kcycles | 13,340 | 35,210 | 88,542 | 29,091 | 25,408 | 34,352 |
| UNAGED-ADHESION @ R.T.-(Self-100% NR Carcass) | | | | | | |
| Tear resistance N/mm | 32.22 | 26.48 | 28.63 | 31.82 | 30.16 | 28.47 |
| Peak Load-N | 850.54 | 853.87 | 838.30 | 854.53 | 800.23 | 839.50 |
| UNAGED-ADHESION @ 100° C.-(Self-100% NR Carcass) | | | | | | |
| Tear resistance N/mm | 19.13 | 17.10 | 12.78 | 17.92 | 15.59 | 17.19 |
| XXX = Only the backing pulled | | | | | | |
| Peak Load-N | 662.71 | 614.16 | 548.48 | 627.46 | 576.25 | 654.78 |
| UNAGED-ADHESION @ R.T. (Self-70/30 SBR/NR Carcass) | | | | | | |
| Tear resistance N/mm | 10.00 | 10.25 | 21.26 | 8.09 | 9.74 | 10.56 |
| Peak Load-N | 380.16 | 568.89 | 750.64 | 229.45 | 386.87 | 505.05 |
| UNAGED-ADHESION @ 100° C. (Self-70/30 SBR/NR Carcass) | | | | | | |
| Tear resistance N/mm | 5.86 | 6.35 | 9.03 | 4.02 | 5.09 | 5.48 |
| Peak Load-N | 257.43 | 271.72 | 320.13 | 300.43 | 182.05 | 235.97 |
| Green Strength | | | | | | |
| Modulus @ 100% PSI | 39.88 | 44.66 | 43.65 | 41.47 | 40.75 | 44.95 |
| Time to Decay 75% from strain end point min. | 3.17 | 4.82 | 4.90 | 3.41 | 3.70 | 5.09 |
| UNAGED-DIE-B TEAR | | | | | | |
| Peak Load-N | 99.64 | 121.35 | 114.66 | 103.96 | 116.05 | 120.99 |
| Tear Resistance-N/mm | 56.29 | 59.39 | 55.39 | 59.64 | 56.89 | 57.34 |
| AGED-72 Hrs. @ 125° C.-DIE-B TEAR | | | | | | |
| Peak Load-N | 65.69 | 64.41 | 68.26 | 55.48 | 67.39 | 73.39 |
| Tear Resistance-N/mm | 33.69 | 33.73 | 36.31 | 33.25 | 33.04 | 34.65 |
| UNAGED-DIE-C TEAR | | | | | | |
| Peak Load-N | 62.07 | 73.30 | 59.23 | 68.12 | 65.97 | 72.08 |
| Tear Resistance-N/mm | 34.00 | 36.48 | 34.86 | 36.43 | 34.18 | 35.42 |
| AGED-72 Hrs. @ 125° C.-DIE-B TEAR | | | | | | |
| Peak Load-N | 120.01 | 125.59 | 118.56 | 118.86 | 117.27 | 121.85 |
| Tear Resistance-N/mm | 58.26 | 60.09 | 59.94 | 60.64 | 56.93 | 58.03 |
| Air Permeability-(To Air) $Cm^3 \cdot cm/cm^2 \cdot sec \cdot ATM \times 10^8$ | | | | | | |
| Sample # 1 | 2.49 | 2.00 | 2.09 | 2.16 | 2.02 | 2.02 |
| Sample # 2 | 2.71 | 2.06 | 2.03 | 2.25 | 1.96 | 1.95 |
| Avg. of Samples #1 and #2 | 2.61 | 2.03 | 2.06 | 2.21 | 1.99 | 1.99 |
| Brittleness ° C. | −38.2 | −38.6 | −38.6 | −38.2 | −37.4 | −39.4 |
| Self-Tack (N/mm) | 1.58 | 1.29 | 1.10 | 1.10 | 1.25 | 1.02 |
| Aged Self-Tack (N/mm) | 1.86 | 0.34 | 1.07 | 0.80 | 0.93 | 1.17 |
| Tack to Carcass (N/mm) | 0.16 | 0.27 | 0.17 | 0.17 | 0.22 | 0.23 |
| Aged Tack to Carcass (N/mm) | 0.32 | 0.33 | 0.23 | 0.27 | 0.25 | 0.28 |

We claim:

1. A composition comprising:
   (a) an elastomer comprising $C_4$ to $C_7$ isoolefin derived units;
   (b) processing oil; and
   (c) a hydrocarbon resin grafted with a graft monomer wherein the hydrocarbon resin has a number average molecular weight of from 400 to 3000 and said graft monomer comprises an unsaturated acid or anhydride.

2. The composition according to claim 1 wherein the hydrocarbon resin is selected from the group consisting of: aliphatic hydrocarbon resins, hydrogenated aliphatic hydrocarbon resins, aromatic hydrocarbon resins, hydrogenated aromatic resins, aliphatic/aromatic hydrocarbon resins, hydrogenated aliphatic/aromatic hydrocarbon resins, cycloaliphatic hydrocarbon resins, hydrogenated cycloaliphatic resins, cycloaliphatic/aromatic hydrocarbon resins, hydrogenated cycloaliphatic/aromatic hydrocarbon resins, polyterpene resins, terpene-phenol resins, rosin esters and mixtures of two or more thereof.

3. The composition according to claim 1 comprising 2-10 phr grafted material.

4. The composition according to claim 1 comprising 4-8 phr grafted material.

5. The composition according to claim 1 wherein hydrocarbon resin is a thermally polymerized aromatic-containing cyclopentadiene hydrocarbon resin.

6. The composition according to claim 1 wherein the hydrocarbon resin is substantially hydrogenated before grafting.

7. The composition according to claim 1 wherein the grafted material has an aromatics content less than 15%.

8. The composition according to claim 1 further comprising a processing oil selected from paraffinic oils, aromatic oils, naphthenic oils, and polybutene processing oils.

9. The composition according to claim 8 comprising 2-20 phr processing oil.

10. The composition according to claim 8 comprising 5-15 phr processing oil.

11. The composition according to claim 1 wherein the graft monomer is maleic anhydride.

12. The composition according to claim 1 further comprising a filler selected from carbon black, modified carbon black, silicates, exfoliated clay, partially exfoliated clay, modified exfoliated clay, modified partially exfoliated clay, and mixtures thereof.

13. The composition according to claim 1 further comprising a secondary rubber selected from natural rubbers, polyisoprene rubber, styrene-butadiene rubber (SBR), polybutadiene rubber, isoprene-butadiene rubber (IBR), styrene-isoprene-butadiene rubber (SIBR), ethylene-propylene rubber, ethylene-propylene-diene rubber (EPDM), polysulfide, nitrile rubber, propylene oxide polymers, poly(isobutylene-co-p-methylstyrene), halogenated poly(isobutylene-co-p-methylstyrene), poly(isobutylene-co-cyclopentadiene), halogenated poly(isobutylene-co-cyclopentadiene), poly (isobutylene-co-isoprene-co-p-methylstyrene), halogenated poly(isobutylene-co-isoprene-co-p-methylstyrene), poly (isobutylene-co-isoprene-co-styrene), halogenated poly (isobutylene-co-isoprene-co-styrene), poly(isobutylene-co-isoprene-co-$\alpha$-methylstyrene) halogenated poly (isobutylene-co-isoprene-co-$\alpha$-methylstyrene) and mixtures thereof.

14. The composition according to claim 1 wherein the elastomer comprises units selected from isobutylene, isobutene, 2-methyl-1-butene, 3-methyl-1-butene, 2-methyl-2-butene, 1-butene, 2-butene, methyl vinyl ether, indene, vinyltrimethylsilane, hexene, 4-methyl-1-pentene, isoprene, butadiene, 2,3-dimethyl-1,3-butadiene, myrcene, 6,6-dimethyl-fulvene, hexadiene, cyclopentadiene, piperylene, styrene, chlorostyrene, methoxystyrene, indene and indene derivatives, $\alpha$-methylstyrene, o-methylstyrene, m-methylstyrene, and p-methylstyrene, and p-tert-butylstyrene.

15. The composition according to claim 1 wherein the elastomer is a terpolymer.

16. The composition according to claim 1 wherein the elastomer is halogenated.

17. The composition according to claim 1 further comprising a curing agent selected from sulfur, sulfur-based compounds, metal oxides, metal oxide complexes, fatty acids, peroxides, diamines, and mixtures thereof.

18. The composition according to claim 1 or 17 having a green tack above 0.5 N/mm.

19. A cured composition according to claim 17 having a brittleness temperature below −36° C.

20. A cured composition according to claim 17 having an air permeability less than $4.0 \times 10^{-8}$ cm$^3$·cm/cm$^2$·sec·atm.

21. A process for manufacturing an air barrier comprising mixing (a) an elastomer comprising $C_4$ to $C_7$ isoolefin derived units; (b) a processing oil; (c) a grafted material obtainable by the reaction of an unsaturated acid or anhydride and a hydrocarbon resin having a number average molecular weight of from 400 to 3000.

* * * * *